(12) United States Patent
Verhoff et al.

(10) Patent No.: US 12,434,672 B1
(45) Date of Patent: *Oct. 7, 2025

(54) MILITARY VEHICLE

(71) Applicant: Oshkosh Defense, LLC, Oshkosh, WI (US)

(72) Inventors: Don Verhoff, Oshkosh, WI (US); Gary Schmiedel, Oshkosh, WI (US); Chris Yakes, Oshkosh, WI (US); Rob Messina, Oshkosh, WI (US); Brian Wilkins, Oshkosh, WI (US); Kent Schulte, Oshkosh, WI (US); Daniel R. Seffernick, Oshkosh, WI (US); Joseph Holda, Oshkosh, WI (US); Michael Peotter, Oshkosh, WI (US); David McGraw, Oshkosh, WI (US); Anthony Seefeldt, Oshkosh, WI (US); Dave Pelko, Oshkosh, WI (US); Jesse Gander, Oshkosh, WI (US); Jerry Reineking, Oshkosh, WI (US); Jesse Steinke, Oshkosh, WI (US)

(73) Assignee: OSHKOSH DEFENSE, LLC, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,395

(22) Filed: Oct. 12, 2023

Related U.S. Application Data

(63) Continuation of application No. 17/748,589, filed on May 19, 2022, now Pat. No. 11,840,208, which is a
(Continued)

(51) Int. Cl.
*F41H 5/16* (2006.01)
*B60G 17/04* (2006.01)
(Continued)

(52) U.S. Cl.
CPC ............. *B60T 7/20* (2013.01); *B60G 17/04* (2013.01); *B60T 13/14* (2013.01); *B60T 13/16* (2013.01);
(Continued)

(58) Field of Classification Search
CPC . B60T 7/20; B60T 13/14; B60T 13/16; B60T 13/66; B60T 13/581; B60T 13/583;
(Continued)

(56) References Cited

U.S. PATENT DOCUMENTS

| 815,574 A | 3/1906 | Russell |
| 1,001,863 A | 8/1911 | Kirkwood |

(Continued)

FOREIGN PATENT DOCUMENTS

| CA | 2478228 A1 | 2/2006 |
| CA | 2581525 | 4/2006 |

(Continued)

OTHER PUBLICATIONS

U.S. Appl. No. 10/171,075, filed Jun. 13, 2002.
(Continued)

*Primary Examiner* — Robert A. Siconolfi
*Assistant Examiner* — San M Aung
(74) *Attorney, Agent, or Firm* — FOLEY & LARDNER LLP

(57) ABSTRACT

A brake system includes an air-to-hydraulic intensifier configured to couple to a brake actuator that engages a brake to limit movement of a tractive element where the air-to-hydraulic intensifier is configured to receive a supply of air and provide a hydraulic fluid to the brake actuator based on the supply of air to overcome a brake biasing force of the brake actuator to disengage the brake actuator from the brake to permit movement of the tractive element, a hydraulic reservoir coupled to the air-to-hydraulic intensifier, and a
(Continued)

valve. The valve includes a first port fluidly coupled to the air-to-hydraulic intensifier, a second port fluidly coupled to the hydraulic reservoir, a third port fluidly coupled to the brake actuator, and a valve gate that is repositionable between a first position that couples the first port to the third port and a second position that couples the second port to the third port.

19 Claims, 9 Drawing Sheets

Related U.S. Application Data continuation of application No. 17/462,595, filed on Aug. 31, 2021, now Pat. No. 11,364,882, which is a continuation of application No. 16/529,508, filed on Aug. 1, 2019, now Pat. No. 11,541,851, which is a continuation of application No. 15/599,174, filed on May 18, 2017, now Pat. No. 10,434,995, which is a continuation of application No. 14/724,279, filed on May 28, 2015, now Pat. No. 9,656,640, which is a continuation of application No. 13/841,686, filed on Mar. 15, 2013, now Pat. No. 9,045,014.

(60) Provisional application No. 61/615,812, filed on Mar. 26, 2012.

(51) Int. Cl.
| | |
|---|---|
| *B60K 17/10* | (2006.01) |
| *B60T 7/20* | (2006.01) |
| *B60T 13/14* | (2006.01) |
| *B60T 13/16* | (2006.01) |
| *B60T 13/24* | (2006.01) |
| *B60T 13/58* | (2006.01) |
| *B60T 13/66* | (2006.01) |
| *B62D 21/15* | (2006.01) |
| *B62D 21/18* | (2006.01) |
| *B62D 24/00* | (2006.01) |
| *B62D 33/06* | (2006.01) |
| *B62D 63/02* | (2006.01) |
| *F41H 7/04* | (2006.01) |

(52) U.S. Cl.
CPC .......... *B60T 13/249* (2013.01); *B60T 13/581* (2013.01); *B60T 13/583* (2013.01); *B62D 21/152* (2013.01); *B62D 21/18* (2013.01); *B62D 24/00* (2013.01); *B62D 33/0617* (2013.01); *B62D 63/025* (2013.01); *F41H 5/16* (2013.01); *F41H 7/044* (2013.01); *B60G 2300/07* (2013.01); *B60K 17/105* (2013.01); *B60T 13/66* (2013.01); *F41H 7/048* (2013.01)

(58) Field of Classification Search
CPC ........ B60T 1/062; B60T 8/362; B60T 8/3605; B62D 21/18; B62D 21/152; B62D 24/00; F16D 2121/06
USPC .................. 188/152; 303/DIG. 12
See application file for complete search history.

(56) References Cited

U.S. PATENT DOCUMENTS

| | | | |
|---|---|---|---|
| 1,278,460 A | 9/1918 | Hanger | |
| 1,376,467 A | 5/1921 | Simmon | |
| 1,463,569 A | 7/1923 | Bathrick | |
| 1,835,132 A | 12/1931 | Anania | |
| 1,941,582 A | 1/1934 | Schroeder | |
| 2,261,693 A | 11/1941 | Mathauer | |
| 2,628,127 A | 2/1953 | Palsgrove | |
| 2,632,577 A | 3/1953 | Sacco | |
| 2,907,575 A | 10/1959 | Locker | |
| 2,915,334 A | 12/1959 | Barenyi | |
| 2,916,997 A | 12/1959 | Terrie | |
| 2,997,242 A | 8/1961 | Grosholz | |
| 3,010,533 A | 11/1961 | Ross | |
| 3,021,166 A | 2/1962 | Kempel et al. | |
| 3,039,788 A | 6/1962 | Farago | |
| 3,046,045 A | 7/1962 | Campbell | |
| 3,083,790 A | 4/1963 | McAfee et al. | |
| 3,131,963 A | 5/1964 | Schilberg | |
| 3,146,839 A | 9/1964 | Carlson | |
| 3,188,966 A | 6/1965 | Tetlow | |
| 3,306,390 A | 2/1967 | Jamme | |
| 3,395,672 A | 8/1968 | Ruf | |
| 3,500,961 A | 3/1970 | Eberhardt et al. | |
| 3,590,948 A | 7/1971 | Milner, Jr. | |
| 3,726,308 A | 4/1973 | Eberhardt | |
| 3,778,115 A * | 12/1973 | Ryburn ................. | B60T 13/585 |
| | | | 303/3 |
| 3,881,767 A | 5/1975 | Klees | |
| 4,037,664 A | 7/1977 | Gibson | |
| 4,059,170 A | 11/1977 | Young | |
| 4,072,362 A * | 2/1978 | Van Anrooy ......... | B60T 13/683 |
| | | | 303/7 |
| 4,084,522 A | 4/1978 | Younger | |
| 4,103,757 A | 8/1978 | McVaugh | |
| 4,153,262 A | 5/1979 | Diamond et al. | |
| 4,157,733 A | 6/1979 | Ewers et al. | |
| 4,160,492 A | 7/1979 | Johnston | |
| 4,185,924 A | 1/1980 | Graham | |
| 4,241,803 A | 12/1980 | Lauber | |
| 4,270,771 A | 6/1981 | Fujii | |
| 4,280,393 A | 7/1981 | Giraud et al. | |
| 4,326,445 A * | 4/1982 | Bemiss .............. | B62D 25/2072 |
| | | | 89/36.02 |
| 4,329,109 A | 5/1982 | Den Bleyker | |
| 4,337,830 A | 7/1982 | Eberhardt | |
| 4,369,010 A | 1/1983 | Ichinose et al. | |
| 4,373,600 A | 2/1983 | Buschbom et al. | |
| 4,395,191 A | 7/1983 | Kaiser | |
| 4,422,685 A | 12/1983 | Bonfilio et al. | |
| 4,456,093 A | 6/1984 | Finley et al. | |
| 4,492,282 A | 1/1985 | Appelblatt et al. | |
| 4,558,758 A | 12/1985 | Littman et al. | |
| 4,563,124 A | 1/1986 | Eskew | |
| 4,586,743 A | 5/1986 | Edwards et al. | |
| 4,587,862 A | 5/1986 | Hoffman | |
| 4,655,307 A | 4/1987 | Lamoureux | |
| 4,659,104 A | 4/1987 | Tanaka et al. | |
| 4,669,744 A | 6/1987 | Sano et al. | |
| 4,696,489 A | 9/1987 | Fujishiro et al. | |
| 4,709,358 A | 11/1987 | Appling et al. | |
| 4,733,876 A | 3/1988 | Heider et al. | |
| 4,811,804 A | 3/1989 | Ewers et al. | |
| 4,826,141 A | 5/1989 | Buma et al. | |
| 4,834,418 A | 5/1989 | Buma et al. | |
| 4,848,835 A | 7/1989 | Derees | |
| 4,889,395 A * | 12/1989 | Fujita ....................... | B60T 8/46 |
| | | | 303/115.1 |
| 4,926,954 A | 5/1990 | Ataka et al. | |
| 4,945,780 A | 8/1990 | Bosma | |
| 5,004,156 A | 4/1991 | Montanier | |
| 5,010,971 A | 4/1991 | Hamada et al. | |
| 5,021,917 A | 6/1991 | Pike et al. | |
| 5,028,088 A | 7/1991 | Del Monico et al. | |
| 5,040,823 A | 8/1991 | Lund | |
| 5,054,806 A | 10/1991 | Chester | |
| 5,076,597 A | 12/1991 | Korekane et al. | |
| 5,080,392 A | 1/1992 | Bazergui | |
| 5,111,901 A | 5/1992 | Bachhuber et al. | |
| 5,113,946 A | 5/1992 | Cooper | |
| 5,137,101 A | 8/1992 | Schaeff | |
| 5,137,292 A | 8/1992 | Eisen | |
| 5,139,104 A | 8/1992 | Moscicki | |
| 5,143,326 A | 9/1992 | Parks | |
| 5,158,614 A | 10/1992 | Takeuchi | |
| 5,169,197 A | 12/1992 | Underbakke et al. | |

(56) References Cited

U.S. PATENT DOCUMENTS

| | | | |
|---|---|---|---|
| 5,209,003 A | 5/1993 | Maxfield et al. |
| 5,211,245 A | 5/1993 | Relyea et al. |
| 5,217,083 A | 6/1993 | Bachhuber et al. |
| 5,301,756 A | 4/1994 | Relyea et al. |
| 5,314,230 A | 5/1994 | Hutchison et al. |
| 5,319,436 A | 6/1994 | Manns et al. |
| 5,322,321 A | 6/1994 | Yopp |
| 5,327,989 A | 7/1994 | Furuhashi et al. |
| 5,346,334 A | 9/1994 | Einaru et al. |
| 5,368,317 A | 11/1994 | McCombs et al. |
| 5,390,945 A | 2/1995 | Orr |
| 5,438,908 A | 8/1995 | Madden, Jr. |
| 5,467,827 A | 11/1995 | McLoughlin |
| 5,476,202 A | 12/1995 | Lipp |
| 5,487,323 A | 1/1996 | Madden, Jr. |
| 5,501,288 A | 3/1996 | Ducote |
| 5,533,781 A | 7/1996 | Williams |
| 5,538,185 A | 7/1996 | Rabitsch et al. |
| 5,538,274 A | 7/1996 | Schmitz et al. |
| 5,549,230 A | 8/1996 | Palmen |
| 5,553,673 A | 9/1996 | Hackman |
| 5,617,696 A | 4/1997 | Young |
| 5,663,520 A | 9/1997 | Ladika et al. |
| 5,670,734 A | 9/1997 | Middione et al. |
| 5,679,918 A | 10/1997 | Korpi et al. |
| 5,687,669 A | 11/1997 | Engler |
| 5,716,066 A | 2/1998 | Chou et al. |
| 5,746,396 A | 5/1998 | Thorton-Trump |
| 5,752,862 A | 5/1998 | Mohler et al. |
| 5,785,372 A | 7/1998 | Glatzmeier et al. |
| 5,788,158 A | 8/1998 | Relyea |
| 5,794,966 A | 8/1998 | MacLeod |
| 5,807,056 A | 9/1998 | Osborn et al. |
| 5,820,150 A | 10/1998 | Archer et al. |
| D400,835 S | 11/1998 | Le Quement et al. |
| 5,836,657 A | 11/1998 | Tilley et al. |
| 5,839,664 A | 11/1998 | Relyea |
| RE36,196 E | 4/1999 | Eberhardt |
| 5,897,123 A | 4/1999 | Cherney et al. |
| 5,899,276 A | 5/1999 | Relyea et al. |
| 5,900,199 A | 5/1999 | Dickson et al. |
| 5,905,225 A | 5/1999 | Joynt |
| 5,909,780 A | 6/1999 | De Andrade |
| 5,915,728 A | 6/1999 | Blackburn |
| 5,915,775 A | 6/1999 | Martin et al. |
| 5,919,240 A | 7/1999 | Ney et al. |
| 5,954,364 A | 9/1999 | Nechushtan |
| 6,009,953 A | 1/2000 | Laskaris et al. |
| 6,015,155 A | 1/2000 | Brookes et al. |
| 6,036,201 A | 3/2000 | Pond et al. |
| 6,101,794 A | 8/2000 | Christopherson et al. |
| 6,105,984 A | 8/2000 | Schmitz et al. |
| 6,109,684 A | 8/2000 | Reitnouer |
| 6,131,685 A | 10/2000 | Sakamoto et al. |
| 6,149,226 A | 11/2000 | Hoelzel et al. |
| 6,155,351 A | 12/2000 | Breedlove et al. |
| 6,178,746 B1 | 1/2001 | Thoma et al. |
| 6,220,532 B1 | 4/2001 | Manon et al. |
| 6,231,466 B1 | 5/2001 | Thoma et al. |
| 6,270,098 B1 | 8/2001 | Heyring et al. |
| 6,270,153 B1 | 8/2001 | Toyao et al. |
| 6,289,995 B1 | 9/2001 | Fuller |
| 6,311,795 B1 | 11/2001 | Skotnikov et al. |
| 6,318,742 B2 | 11/2001 | Franzini |
| 6,357,769 B1 | 3/2002 | Omundson et al. |
| 6,364,597 B2 | 4/2002 | Klinkenberg |
| 6,394,007 B2 | 5/2002 | Lewis et al. |
| 6,394,534 B1 | 5/2002 | Dean |
| 6,398,236 B1 | 6/2002 | Richardson |
| 6,398,478 B2 | 6/2002 | Smith et al. |
| 6,421,593 B1 | 7/2002 | Kempen et al. |
| 6,435,071 B1 | 8/2002 | Campbell |
| 6,435,298 B1 | 8/2002 | Mizuno et al. |
| 6,443,687 B1 | 9/2002 | Kaiser |
| 6,460,907 B2 | 10/2002 | Usui |
| 6,503,035 B1 | 1/2003 | Perrott |
| 6,516,914 B1 | 2/2003 | Andersen et al. |
| 6,520,494 B1 | 2/2003 | Andersen et al. |
| 6,527,494 B2 | 3/2003 | Hurlburt |
| D473,829 S | 4/2003 | Hoyle, Jr. |
| 6,553,290 B1 | 4/2003 | Pillar |
| D474,430 S | 5/2003 | Hill et al. |
| 6,561,718 B1 | 5/2003 | Archer et al. |
| 6,619,673 B2 | 9/2003 | Eckelberry et al. |
| 6,623,020 B1 | 9/2003 | Satou |
| 6,658,984 B2 | 12/2003 | Zonak |
| 6,692,366 B1 | 2/2004 | Savant |
| 6,695,328 B2 | 2/2004 | Cope |
| 6,695,566 B2 | 2/2004 | Rodriguez Navio |
| 6,702,058 B2 | 3/2004 | Ishii et al. |
| 6,736,232 B1 | 5/2004 | Bergstrom et al. |
| 6,757,597 B2 | 6/2004 | Yakes et al. |
| 6,764,085 B1 | 7/2004 | Anderson |
| 6,769,733 B2 | 8/2004 | Seksaria et al. |
| 6,779,806 B1 | 8/2004 | Breitbach et al. |
| D497,849 S | 11/2004 | Yanase |
| 6,820,908 B1 | 11/2004 | Tousi et al. |
| 6,848,693 B2 | 2/2005 | Schneider |
| 6,860,332 B1 | 3/2005 | Archer et al. |
| 6,878,481 B2 | 4/2005 | Bushong et al. |
| 6,882,917 B2 | 4/2005 | Pillar et al. |
| 6,883,815 B2 | 4/2005 | Archer |
| 6,885,920 B2 | 4/2005 | Yakes et al. |
| 6,899,191 B1 | 5/2005 | Lykken |
| 6,909,944 B2 | 6/2005 | Pillar et al. |
| 6,922,615 B2 | 7/2005 | Pillar et al. |
| 6,923,453 B2 | 8/2005 | Pivac |
| 6,925,735 B2 | 8/2005 | Hamm et al. |
| 6,959,466 B2 | 11/2005 | Alowonle et al. |
| 6,976,688 B2 | 12/2005 | Archer et al. |
| 6,993,421 B2 | 1/2006 | Pillar et al. |
| 7,006,902 B2 | 2/2006 | Archer et al. |
| 7,024,296 B2 | 4/2006 | Squires et al. |
| D523,381 S | 6/2006 | Taguchi et al. |
| 7,072,745 B2 | 7/2006 | Pillar et al. |
| 7,073,620 B2 | 7/2006 | Braun et al. |
| D528,482 S | 9/2006 | Hamburger |
| 7,107,129 B2 | 9/2006 | Rowe et al. |
| 7,114,764 B1 | 10/2006 | Barsoum et al. |
| 7,127,331 B2 | 10/2006 | Pillar et al. |
| D533,485 S | 12/2006 | Schiavone et al. |
| 7,144,039 B2 | 12/2006 | Kawasaki et al. |
| D535,589 S | 1/2007 | Lau et al. |
| 7,162,332 B2 | 1/2007 | Pillar et al. |
| 7,164,977 B2 | 1/2007 | Yakes et al. |
| 7,184,662 B2 | 2/2007 | Arbel et al. |
| 7,184,862 B2 | 2/2007 | Pillar et al. |
| 7,184,866 B2 | 2/2007 | Squires et al. |
| 7,188,893 B2 | 3/2007 | Akasaka |
| 7,195,306 B2 | 3/2007 | Egawa et al. |
| 7,198,130 B2 | 4/2007 | Schimke |
| 7,198,278 B2 | 4/2007 | Donaldson |
| 7,207,582 B2 | 4/2007 | Siebers et al. |
| 7,213,872 B2 | 5/2007 | Ronacher et al. |
| 7,234,534 B2 | 6/2007 | Froland et al. |
| 7,240,906 B2 | 7/2007 | Klees |
| 7,246,835 B1 | 7/2007 | Colburn et al. |
| 7,254,468 B2 | 8/2007 | Pillar et al. |
| 7,258,194 B2 | 8/2007 | Braun et al. |
| 7,267,394 B1 | 9/2007 | Mouch et al. |
| 7,270,346 B2 | 9/2007 | Rowe et al. |
| 7,274,976 B2 | 9/2007 | Rowe et al. |
| D552,522 S | 10/2007 | Sandy et al. |
| 7,277,782 B2 | 10/2007 | Yakes et al. |
| 7,281,600 B2 | 10/2007 | Chernoff et al. |
| 7,288,920 B2 | 10/2007 | Bushong et al. |
| 7,302,320 B2 | 11/2007 | Nasr et al. |
| 7,306,069 B2 | 12/2007 | Takeshima et al. |
| D561,665 S | 2/2008 | Thomas et al. |
| 7,329,161 B2 | 2/2008 | Roering |
| D563,289 S | 3/2008 | Pfeiffer |
| 7,357,203 B2 | 4/2008 | Morrow et al. |
| D568,217 S | 5/2008 | Tomatsu et al. |
| 7,377,549 B2 | 5/2008 | Hasegawa et al. |

(56) References Cited

U.S. PATENT DOCUMENTS

| | | |
|---|---|---|
| 7,379,797 B2 | 5/2008 | Nasr et al. |
| 7,380,800 B2 | 6/2008 | Klees |
| 7,392,122 B2 | 6/2008 | Pillar et al. |
| 7,393,016 B2 | 7/2008 | Mitsui et al. |
| 7,406,909 B2 | 8/2008 | Shah et al. |
| 7,412,307 B2 | 8/2008 | Pillar et al. |
| 7,419,021 B2 | 9/2008 | Morrow et al. |
| 7,425,891 B2 | 9/2008 | Colburn et al. |
| 7,439,711 B2 | 10/2008 | Bolton |
| 7,441,615 B2 | 10/2008 | Borroni-Bird et al. |
| 7,441,809 B1 | 10/2008 | Coombs et al. |
| 7,448,460 B2 | 11/2008 | Morrow et al. |
| 7,451,028 B2 | 11/2008 | Pillar et al. |
| 7,472,914 B2 | 1/2009 | Anderson et al. |
| 7,472,919 B2 | 1/2009 | Pratt et al. |
| 7,510,235 B2 | 3/2009 | Kobayashi et al. |
| 7,520,354 B2 | 4/2009 | Morrow et al. |
| 7,522,979 B2 | 4/2009 | Pillar |
| 7,555,369 B2 | 6/2009 | Pillar et al. |
| D597,002 S | 7/2009 | Jamieson et al. |
| 7,594,561 B2 | 9/2009 | Hass et al. |
| 7,611,153 B2 | 11/2009 | Kim et al. |
| 7,611,154 B2 | 11/2009 | Delaney |
| 7,618,063 B2 | 11/2009 | Takeshima et al. |
| 7,624,835 B2 | 12/2009 | Bowers |
| 7,624,995 B2 | 12/2009 | Barbison |
| 7,641,268 B2 | 1/2010 | Goffart et al. |
| 7,681,892 B1 | 3/2010 | Crews et al. |
| 7,689,332 B2 | 3/2010 | Yakes et al. |
| 7,695,053 B1 | 4/2010 | Boczek et al. |
| 7,699,385 B2 | 4/2010 | Kurata |
| 7,711,460 B2 | 5/2010 | Yakes et al. |
| 7,715,962 B2 | 5/2010 | Rowe et al. |
| 7,725,225 B2 | 5/2010 | Pillar et al. |
| D617,255 S | 6/2010 | Tezak et al. |
| 7,726,429 B2 | 6/2010 | Suzuki |
| 7,729,831 B2 | 6/2010 | Pillar et al. |
| D619,062 S | 7/2010 | Improta |
| 7,756,621 B2 | 7/2010 | Pillar et al. |
| 7,757,805 B2 | 7/2010 | Wakuta et al. |
| 7,770,506 B2 | 8/2010 | Johnson et al. |
| D623,100 S | 9/2010 | Bimbi |
| D623,565 S | 9/2010 | Cogswell |
| 7,789,010 B2 | 9/2010 | Allor et al. |
| 7,792,618 B2 | 9/2010 | Quigley et al. |
| 7,802,816 B2 | 9/2010 | McGuire |
| D627,686 S | 11/2010 | Thompson et al. |
| 7,824,293 B2 | 11/2010 | Schimke |
| 7,835,838 B2 | 11/2010 | Pillar et al. |
| 7,848,857 B2 | 12/2010 | Nasr et al. |
| 7,905,534 B2 | 3/2011 | Boczek et al. |
| 7,905,540 B2 | 3/2011 | Kiley et al. |
| 7,908,959 B2 | 3/2011 | Pavon |
| D636,305 S | 4/2011 | Alvarez et al. |
| 7,931,103 B2 | 4/2011 | Morrow et al. |
| 7,934,766 B2 | 5/2011 | Boczek et al. |
| 7,938,478 B2 | 5/2011 | Kamimae |
| D642,099 S | 7/2011 | Nagao et al. |
| 7,997,182 B1 | 8/2011 | Cox |
| 8,000,850 B2 | 8/2011 | Nasr et al. |
| D646,203 S | 10/2011 | Thompson et al. |
| D646,607 S | 10/2011 | Verhee et al. |
| 8,029,021 B2 | 10/2011 | Leonard et al. |
| 8,033,208 B2 | 10/2011 | Joynt et al. |
| D649,908 S | 12/2011 | Mullen |
| D649,909 S | 12/2011 | Mullen |
| 8,095,247 B2 | 1/2012 | Pillar et al. |
| 8,096,225 B1 | 1/2012 | Johnson et al. |
| 8,123,645 B2 | 2/2012 | Schimke |
| D655,226 S | 3/2012 | Hanson et al. |
| 8,139,109 B2 | 3/2012 | Schmiedel et al. |
| 8,146,477 B2 | 4/2012 | Joynt |
| 8,146,478 B2 | 4/2012 | Joynt et al. |
| D661,231 S | 6/2012 | Galante et al. |
| 8,205,703 B2 | 6/2012 | Halliday |
| D662,865 S | 7/2012 | Van Braeckel |
| 8,333,390 B2 | 12/2012 | Linsmeier et al. |
| 8,347,775 B2 | 1/2013 | Altenhof et al. |
| 8,376,077 B2 | 2/2013 | Venton-Walters |
| 8,402,878 B2 | 3/2013 | Schreiner et al. |
| 8,413,567 B2 | 4/2013 | Luther et al. |
| 8,413,568 B2 | 4/2013 | Kosheleff |
| 8,424,443 B2 | 4/2013 | Gonzalez |
| 8,430,196 B2 | 4/2013 | Halliday |
| D683,675 S | 6/2013 | Munson et al. |
| 8,459,619 B2 | 6/2013 | Trinh et al. |
| 8,465,025 B2 | 6/2013 | Venton-Walters et al. |
| D686,121 S | 7/2013 | McCabe et al. |
| 8,561,735 B2 | 10/2013 | Morrow et al. |
| 8,578,834 B2 | 11/2013 | Tunis et al. |
| 8,596,183 B2 | 12/2013 | Coltrane |
| 8,596,648 B2 | 12/2013 | Venton-Walters et al. |
| 8,601,931 B2 | 12/2013 | Naroditsky et al. |
| 8,616,617 B2 | 12/2013 | Sherbeck et al. |
| D698,281 S | 1/2014 | Badstuebner et al. |
| 8,635,776 B2 | 1/2014 | Newberry et al. |
| 8,667,880 B1 | 3/2014 | Berman |
| D702,615 S | 4/2014 | Conway et al. |
| D703,119 S | 4/2014 | Platto et al. |
| 8,714,592 B1 | 5/2014 | Thoreson et al. |
| 8,746,741 B2 | 6/2014 | Gonzalez |
| 8,764,029 B2 | 7/2014 | Venton-Walters et al. |
| 8,770,086 B2 | 7/2014 | Enck |
| 8,801,017 B2 | 8/2014 | Ellifson et al. |
| D714,476 S | 9/2014 | Lai |
| 8,863,884 B2 | 10/2014 | Jacob-Lloyd |
| 8,876,133 B2 | 11/2014 | Ellifson |
| D718,683 S | 12/2014 | Thole et al. |
| 8,905,164 B1 | 12/2014 | Capouellez et al. |
| 8,921,130 B2 | 12/2014 | Kundaliya et al. |
| 8,943,946 B1 | 2/2015 | Richmond et al. |
| 8,944,497 B2 | 2/2015 | Dryselius et al. |
| 8,947,531 B2 | 2/2015 | Fischer et al. |
| 8,955,859 B1 | 2/2015 | Richmond et al. |
| 8,960,068 B2 | 2/2015 | Jacquemont et al. |
| D725,555 S | 3/2015 | Wolff et al. |
| 8,967,699 B1 | 3/2015 | Richmond et al. |
| 8,991,834 B2 | 3/2015 | Venton-Walters et al. |
| 8,991,840 B2 | 3/2015 | Zuleger et al. |
| 9,016,703 B2 | 4/2015 | Rowe et al. |
| D728,435 S | 5/2015 | Hanson et al. |
| 9,045,014 B1 | 6/2015 | Verhoff et al. |
| D735,625 S | 8/2015 | Mays et al. |
| D739,317 S | 9/2015 | McMahan et al. |
| D740,187 S | 10/2015 | Jamieson |
| 9,156,507 B1 | 10/2015 | Reed |
| D742,287 S | 11/2015 | Hanson et al. |
| D743,308 S | 11/2015 | Hanson et al. |
| D743,856 S | 11/2015 | Ma |
| 9,174,686 B1 | 11/2015 | Oshkosh |
| D745,986 S | 12/2015 | Gorsten Schuenemann et al. |
| 9,221,496 B2 | 12/2015 | Barr et al. |
| D749,464 S | 2/2016 | Giolito |
| 9,291,230 B2 | 3/2016 | Ellifson et al. |
| D754,039 S | 4/2016 | Behmer et al. |
| 9,303,715 B2 | 4/2016 | Oshkosh |
| 9,327,576 B2 | 5/2016 | Ellifson |
| 9,328,986 B1 | 5/2016 | Pennau et al. |
| 9,329,000 B1 | 5/2016 | Richmond et al. |
| 9,358,879 B1 | 6/2016 | Bennett |
| 9,366,507 B1 | 6/2016 | Richmond et al. |
| D762,148 S | 7/2016 | Platto et al. |
| 9,409,471 B2 | 8/2016 | Hoppe et al. |
| 9,420,203 B2 | 8/2016 | Broggi et al. |
| D765,566 S | 9/2016 | Vena et al. |
| D768,320 S | 10/2016 | Lai |
| D769,160 S | 10/2016 | Platto et al. |
| D772,768 S | 11/2016 | Chiang |
| 9,492,695 B2 | 11/2016 | Betz et al. |
| D774,994 S | 12/2016 | Alemany et al. |
| D775,021 S | 12/2016 | Harriton et al. |
| D776,003 S | 1/2017 | Lee et al. |
| D777,220 S | 1/2017 | Powell |
| D777,615 S | 1/2017 | Hanson et al. |

(56) References Cited

U.S. PATENT DOCUMENTS

| | | |
|---|---|---|
| D778,217 S | 2/2017 | Ito et al. |
| D782,711 S | 3/2017 | Dunshee et al. |
| D784,219 S | 4/2017 | Jung |
| D787,993 S | 5/2017 | McCabe et al. |
| 9,650,005 B2 | 5/2017 | Patelczyk et al. |
| 9,656,640 B1 | 5/2017 | Verhoff et al. |
| D789,840 S | 6/2017 | Curic et al. |
| D790,409 S | 6/2017 | Baste |
| 9,688,112 B2 | 6/2017 | Venton-Walters et al. |
| D791,987 S | 7/2017 | Lin |
| 9,707,869 B1 | 7/2017 | Messina et al. |
| D794,853 S | 8/2017 | Lai |
| 9,738,186 B2 | 8/2017 | Krueger et al. |
| D796,715 S | 9/2017 | Lin |
| D797,332 S | 9/2017 | Lin |
| D797,603 S | 9/2017 | Noone et al. |
| D802,491 S | 11/2017 | Mainville |
| D804,065 S | 11/2017 | Lai |
| 9,809,080 B2 | 11/2017 | Ellifson et al. |
| 9,829,282 B1 | 11/2017 | Richmond et al. |
| D804,372 S | 12/2017 | Kozub |
| D805,965 S | 12/2017 | Davis |
| D805,968 S | 12/2017 | Piscitelli et al. |
| D813,757 S | 3/2018 | Kozub |
| D813,758 S | 3/2018 | Gonzales |
| D815,574 S | 4/2018 | Mainville |
| D818,885 S | 5/2018 | Seo |
| D820,179 S | 6/2018 | Kladde |
| D823,182 S | 7/2018 | Yates |
| D823,183 S | 7/2018 | Yates |
| D824,294 S | 7/2018 | Ge et al. |
| 10,023,243 B2 | 7/2018 | Hines et al. |
| 10,030,737 B2 | 7/2018 | Dillman et al. |
| D824,806 S | 8/2018 | Knox |
| D824,811 S | 8/2018 | Mainville |
| D824,814 S | 8/2018 | Heyde |
| D827,410 S | 9/2018 | Earley |
| D828,258 S | 9/2018 | Zipfel |
| D830,242 S | 10/2018 | Zipfel |
| D837,106 S | 1/2019 | Yang |
| D837,702 S | 1/2019 | Gander et al. |
| D839,164 S | 1/2019 | Zipfel |
| 10,184,553 B2 | 1/2019 | Kwiatkowski et al. |
| D842,183 S | 3/2019 | Jackson et al. |
| D843,281 S | 3/2019 | Gander et al. |
| D849,283 S | 5/2019 | Lin |
| D850,676 S | 6/2019 | Lin |
| D853,285 S | 7/2019 | Yang |
| D853,293 S | 7/2019 | Heroux et al. |
| D856,860 S | 8/2019 | Gander |
| 10,369,860 B2 | 8/2019 | Ellifson et al. |
| 10,392,056 B2 | 8/2019 | Perron et al. |
| D859,226 S | 9/2019 | Grooms |
| D860,887 S | 9/2019 | Gander et al. |
| 10,421,332 B2 | 9/2019 | Venton-Walters et al. |
| D862,752 S | 10/2019 | Lai |
| D863,144 S | 10/2019 | Gander |
| D864,031 S | 10/2019 | Gander et al. |
| D864,802 S | 10/2019 | Davis et al. |
| 10,434,995 B2 | 10/2019 | Verhoff et al. |
| 10,435,026 B2 | 10/2019 | Shively et al. |
| D865,601 S | 11/2019 | Goodrich et al. |
| D867,951 S | 11/2019 | Izard |
| D869,332 S | 12/2019 | Gander et al. |
| D871,283 S | 12/2019 | Gander et al. |
| 10,495,419 B1 | 12/2019 | Krueger et al. |
| 10,609,874 B1 | 4/2020 | Shumaker |
| 10,611,203 B1 | 4/2020 | Rositch et al. |
| 10,611,204 B1 | 4/2020 | Zhang et al. |
| 10,619,696 B2 | 4/2020 | Dillman et al. |
| 10,632,805 B1 | 4/2020 | Rositch et al. |
| D883,876 S | 5/2020 | Beasley et al. |
| D885,281 S | 5/2020 | Duncan et al. |
| D887,050 S | 6/2020 | Lin |
| D888,629 S | 6/2020 | Gander et al. |
| D891,331 S | 7/2020 | Dickman et al. |
| D892,002 S | 8/2020 | Gander |
| D893,066 S | 8/2020 | Lin |
| D894,063 S | 8/2020 | Dionisopoulos et al. |
| D894,442 S | 8/2020 | Lin |
| 10,752,075 B1 | 8/2020 | Shukla et al. |
| D897,010 S | 9/2020 | Momokawa |
| 10,759,251 B1 | 9/2020 | Zuleger |
| D898,244 S | 10/2020 | Badstuebner et al. |
| D898,632 S | 10/2020 | Gander |
| D899,979 S | 10/2020 | Hamilton et al. |
| D900,690 S | 11/2020 | Lovati |
| D902,096 S | 11/2020 | Gander et al. |
| D902,807 S | 11/2020 | Ruiz |
| D902,809 S | 11/2020 | Hunwick |
| D904,227 S | 12/2020 | Bracy |
| D904,240 S | 12/2020 | Heilaneh et al. |
| D906,902 S | 1/2021 | Duncan et al. |
| D908,935 S | 1/2021 | Lin |
| D909,639 S | 2/2021 | Chen |
| D909,641 S | 2/2021 | Chen |
| D909,644 S | 2/2021 | Chen |
| D909,934 S | 2/2021 | Gander et al. |
| D910,502 S | 2/2021 | Duncan et al. |
| 10,906,396 B1 | 2/2021 | Schimke et al. |
| D911,883 S | 3/2021 | Bae |
| D914,562 S | 3/2021 | Kirkman et al. |
| D915,252 S | 4/2021 | Duncan et al. |
| 10,978,039 B2 | 4/2021 | Seffernick et al. |
| 10,981,538 B2 | 4/2021 | Archer et al. |
| 10,987,829 B2 | 4/2021 | Datema et al. |
| D919,527 S | 5/2021 | Bender et al. |
| D922,916 S | 6/2021 | Koo |
| D924,740 S | 7/2021 | Zhao et al. |
| D925,416 S | 7/2021 | Duncan et al. |
| D925,421 S | 7/2021 | Mallicote et al. |
| D926,093 S | 7/2021 | Mcmath |
| D926,642 S | 8/2021 | Duncan et al. |
| D928,672 S | 8/2021 | Gander et al. |
| D929,913 S | 9/2021 | Gander |
| D930,862 S | 9/2021 | Gander et al. |
| D932,397 S | 10/2021 | Kaneko et al. |
| D933,545 S | 10/2021 | Piaskowski et al. |
| D933,547 S | 10/2021 | Hamilton et al. |
| D934,306 S | 10/2021 | Boone et al. |
| D934,745 S | 11/2021 | Kentley-Klay et al. |
| D934,766 S | 11/2021 | Duncan et al. |
| D935,962 S | 11/2021 | Grand |
| D935,965 S | 11/2021 | Yang |
| D935,966 S | 11/2021 | Bibb |
| D936,529 S | 11/2021 | Tang et al. |
| 11,173,959 B2 | 11/2021 | Chalifour |
| 11,181,345 B2 | 11/2021 | Krueger et al. |
| D939,393 S | 12/2021 | Jevremovic |
| D940,605 S | 1/2022 | Sheffield et al. |
| D940,607 S | 1/2022 | Park et al. |
| D941,195 S | 1/2022 | Koo et al. |
| D942,340 S | 2/2022 | Hallgren |
| D944,136 S | 2/2022 | De Leon |
| D945,335 S | 3/2022 | Duncan et al. |
| 11,260,835 B2 | 3/2022 | Verhoff et al. |
| 11,273,804 B2 | 3/2022 | Verhoff et al. |
| 11,273,805 B2 | 3/2022 | Verhoff et al. |
| D952,536 S | 5/2022 | Finney et al. |
| 11,332,104 B2 | 5/2022 | Verhoff et al. |
| D955,946 S | 6/2022 | Kirkman et al. |
| 11,364,882 B2 | 6/2022 | Verhoff et al. |
| D960,059 S | 8/2022 | Mallicote et al. |
| D961,478 S | 8/2022 | Hoste et al. |
| D966,161 S | 10/2022 | Ruiz et al. |
| D980,145 S | 3/2023 | Schwartz et al. |
| D1,000,652 S | 10/2023 | Wu |
| D1,004,510 S | 11/2023 | Bryant et al. |
| D1,010,520 S | 1/2024 | Bjerke |
| D1,016,683 S | 3/2024 | Heilaneh et al. |
| D1,020,557 S | 4/2024 | Lin |
| D1,020,560 S | 4/2024 | Lin |
| D1,022,063 S | 4/2024 | Ye |
| D1,025,848 S | 5/2024 | Piaskowski et al. |

(56) References Cited

U.S. PATENT DOCUMENTS

| | | |
|---|---|---|
| D1,027,731 S | 5/2024 | Lee |
| D1,029,703 S | 6/2024 | Powell et al. |
| D1,029,705 S | 6/2024 | Gound |
| D1,030,557 S | 6/2024 | Willing et al. |
| D1,031,105 S | 6/2024 | Wu |
| D1,032,414 S | 6/2024 | Ecuyer et al. |
| D1,033,282 S | 7/2024 | Kim et al. |
| D1,034,320 S | 7/2024 | Tsuchida et al. |
| D1,034,325 S | 7/2024 | Kaban et al. |
| D1,034,347 S | 7/2024 | Moffett |
| D1,034,839 S | 7/2024 | Ye |
| D1,036,321 S | 7/2024 | Duncan et al. |
| D1,037,088 S | 7/2024 | Demkiw et al. |
| D1,037,960 S | 8/2024 | Sicot |
| D1,039,432 S | 8/2024 | Badstuebner et al. |
| D1,039,433 S | 8/2024 | Badstuebner et al. |
| D1,040,056 S | 8/2024 | Asok |
| D1,040,057 S | 8/2024 | Asok |
| D1,040,691 S | 9/2024 | Armigliato et al. |
| D1,040,870 S | 9/2024 | Armigliato et al. |
| D1,042,226 S | 9/2024 | Lee |
| D1,042,229 S | 9/2024 | Kuhlmann |
| D1,042,249 S | 9/2024 | Wu |
| D1,042,251 S | 9/2024 | Willing et al. |
| D1,043,472 S | 9/2024 | Wu |
| D1,044,612 S | 10/2024 | Wu |
| D1,049,949 S | 11/2024 | Montoya Bueloni et al. |
| D1,049,958 S | 11/2024 | Oh |
| D1,055,788 S | 12/2024 | Young et al. |
| D1,059,229 S | 1/2025 | Kobayashi |
| D1,061,966 S | 2/2025 | Wu |
| D1,063,727 S | 2/2025 | Wu |
| D1,063,728 S | 2/2025 | Wu |
| D1,063,733 S | 2/2025 | Willing et al. |
| 2001/0015559 A1 | 8/2001 | Storer |
| 2002/0103580 A1 | 8/2002 | Yakes et al. |
| 2002/0119364 A1 | 8/2002 | Bushong et al. |
| 2002/0129696 A1 | 9/2002 | Pek et al. |
| 2002/0130771 A1 | 9/2002 | Osborne et al. |
| 2002/0153183 A1 | 10/2002 | Puterbaugh et al. |
| 2002/0190516 A1 | 12/2002 | Henksmeier et al. |
| 2003/0001346 A1 | 1/2003 | Hamilton et al. |
| 2003/0155164 A1 | 8/2003 | Mantini et al. |
| 2003/0158638 A1 | 8/2003 | Yakes et al. |
| 2003/0205422 A1 | 11/2003 | Morrow et al. |
| 2003/0230863 A1 | 12/2003 | Archer |
| 2004/0069553 A1 | 4/2004 | Ohashi et al. |
| 2004/0074686 A1 | 4/2004 | Abend et al. |
| 2004/0113377 A1 | 6/2004 | Klees |
| 2004/0130168 A1 | 7/2004 | O'Connell |
| 2004/0133332 A1 | 7/2004 | Yakes et al. |
| 2004/0145344 A1 | 7/2004 | Bushong et al. |
| 2004/0149500 A1 | 8/2004 | Chernoff et al. |
| 2004/0245039 A1 | 12/2004 | Braun et al. |
| 2004/0256024 A1 | 12/2004 | Schlachter |
| 2005/0001400 A1 | 1/2005 | Archer et al. |
| 2005/0034911 A1 | 2/2005 | Darby |
| 2005/0062239 A1 | 3/2005 | Shore |
| 2005/0093265 A1 | 5/2005 | Niaura et al. |
| 2005/0099885 A1 | 5/2005 | Tamminga |
| 2005/0109553 A1 | 5/2005 | Ishii et al. |
| 2005/0110229 A1 | 5/2005 | Kimura et al. |
| 2005/0113988 A1 | 5/2005 | Nasr et al. |
| 2005/0119806 A1 | 6/2005 | Nasr et al. |
| 2005/0132873 A1 | 6/2005 | Diaz Supisiche et al. |
| 2005/0161891 A1 | 7/2005 | Trudeau et al. |
| 2005/0191542 A1 | 9/2005 | Bushong et al. |
| 2005/0196269 A1 | 9/2005 | Racer et al. |
| 2005/0209747 A1 | 9/2005 | Yakes et al. |
| 2005/0284682 A1 | 12/2005 | Hass et al. |
| 2006/0021541 A1 | 2/2006 | Siebers et al. |
| 2006/0021764 A1 | 2/2006 | Archer et al. |
| 2006/0048986 A1 | 3/2006 | Bracciano |
| 2006/0065451 A1 | 3/2006 | Morrow et al. |
| 2006/0065453 A1 | 3/2006 | Morrow et al. |
| 2006/0070776 A1 | 4/2006 | Morrow et al. |
| 2006/0070788 A1 | 4/2006 | Schimke |
| 2006/0071466 A1 | 4/2006 | Rowe et al. |
| 2006/0082079 A1 | 4/2006 | Eichhorn et al. |
| 2006/0116032 A1 | 6/2006 | Roering |
| 2006/0192354 A1 | 8/2006 | Van Cayzeele |
| 2006/0192361 A1 | 8/2006 | Anderson et al. |
| 2006/0201727 A1 | 9/2006 | Chan |
| 2006/0244225 A1 | 11/2006 | Power et al. |
| 2006/0249325 A1 | 11/2006 | Braun et al. |
| 2006/0273566 A1 | 12/2006 | Hepner et al. |
| 2007/0088469 A1 | 4/2007 | Schmiedel et al. |
| 2007/0102963 A1 | 5/2007 | Frederick et al. |
| 2007/0120334 A1 | 5/2007 | Holbrook |
| 2007/0145816 A1 | 6/2007 | Gile |
| 2007/0158920 A1 | 7/2007 | Delaney |
| 2007/0186762 A1 | 8/2007 | Dehart et al. |
| 2007/0234896 A1 | 10/2007 | Joynt |
| 2007/0246902 A1 | 10/2007 | Trudeau et al. |
| 2007/0288131 A1 | 12/2007 | Yakes et al. |
| 2007/0291130 A1 | 12/2007 | Broggi et al. |
| 2008/0017426 A1 | 1/2008 | Walters et al. |
| 2008/0017434 A1 | 1/2008 | Harper et al. |
| 2008/0034953 A1 | 2/2008 | Barbe et al. |
| 2008/0041048 A1 | 2/2008 | Kanenobu et al. |
| 2008/0053739 A1 | 3/2008 | Chernoff et al. |
| 2008/0059014 A1 | 3/2008 | Nasr et al. |
| 2008/0065285 A1 | 3/2008 | Yakes et al. |
| 2008/0066613 A1 | 3/2008 | Mills et al. |
| 2008/0071438 A1 | 3/2008 | Nasr et al. |
| 2008/0099213 A1 | 5/2008 | Morrow et al. |
| 2008/0150350 A1 | 6/2008 | Morrow et al. |
| 2008/0252025 A1 | 10/2008 | Plath |
| 2008/0284118 A1 | 11/2008 | Venton-Walters et al. |
| 2008/0315629 A1 | 12/2008 | Abe et al. |
| 2009/0001761 A1 | 1/2009 | Yasuhara et al. |
| 2009/0033044 A1 | 2/2009 | Linsmeier |
| 2009/0061702 A1 | 3/2009 | March |
| 2009/0079839 A1 | 3/2009 | Fischer et al. |
| 2009/0088283 A1 | 4/2009 | Schimke |
| 2009/0127010 A1 | 5/2009 | Morrow et al. |
| 2009/0174158 A1 | 7/2009 | Anderson et al. |
| 2009/0194347 A1 | 8/2009 | Morrow et al. |
| 2009/0227410 A1 | 9/2009 | Zhao |
| 2009/0322123 A1 | 12/2009 | Tanaka et al. |
| 2010/0019538 A1 | 1/2010 | Kiley et al. |
| 2010/0026046 A1 | 2/2010 | Mendoza et al. |
| 2010/0032932 A1 | 2/2010 | Hastings |
| 2010/0116569 A1 | 5/2010 | Morrow et al. |
| 2010/0123324 A1 | 5/2010 | Shoup et al. |
| 2010/0163330 A1* | 7/2010 | Halliday ............... F41H 7/044 180/295 |
| 2010/0187864 A1 | 7/2010 | Tsuchida |
| 2010/0218667 A1 | 9/2010 | Naroditsky et al. |
| 2010/0264636 A1 | 10/2010 | Fausch et al. |
| 2010/0301668 A1 | 12/2010 | Yakes et al. |
| 2010/0307328 A1 | 12/2010 | Hoadley et al. |
| 2010/0307329 A1 | 12/2010 | Kaswen et al. |
| 2010/0319525 A1 | 12/2010 | Pavon |
| 2011/0045930 A1 | 2/2011 | Schimke |
| 2011/0068606 A1 | 3/2011 | Klimek et al. |
| 2011/0079134 A1 | 4/2011 | Jacquemont et al. |
| 2011/0079978 A1 | 4/2011 | Schreiner et al. |
| 2011/0114409 A1 | 5/2011 | Venton-Walters |
| 2011/0120791 A1 | 5/2011 | Greenwood et al. |
| 2011/0169240 A1 | 7/2011 | Schreiner et al. |
| 2011/0266838 A1 | 11/2011 | Leopold |
| 2011/0291444 A1 | 12/2011 | Ische |
| 2011/0314999 A1 | 12/2011 | Luther et al. |
| 2012/0049470 A1 | 3/2012 | Rositch et al. |
| 2012/0049570 A1 | 3/2012 | Aizik |
| 2012/0083380 A1 | 4/2012 | Reed et al. |
| 2012/0097019 A1 | 4/2012 | Sherbeck et al. |
| 2012/0098172 A1 | 4/2012 | Trinh et al. |
| 2012/0098215 A1 | 4/2012 | Rositch et al. |
| 2012/0111180 A1 | 5/2012 | Johnson et al. |
| 2012/0143430 A1 | 6/2012 | Broggi et al. |
| 2012/0174767 A1 | 7/2012 | Naroditsky et al. |

(56) References Cited

U.S. PATENT DOCUMENTS

| | | |
|---|---|---|
| 2012/0181100 A1* | 7/2012 | Halliday ............... F41H 1/02 89/930 |
| 2012/0186428 A1 | 7/2012 | Peer et al. |
| 2012/0192706 A1 | 8/2012 | Gonzalez |
| 2012/0193940 A1 | 8/2012 | Tunis et al. |
| 2013/0009423 A1 | 1/2013 | Yamamoto et al. |
| 2013/0014635 A1 | 1/2013 | Kosheleff |
| 2013/0093154 A1 | 4/2013 | Cordier et al. |
| 2013/0153314 A1 | 6/2013 | Niedzwiecki |
| 2013/0205984 A1 | 8/2013 | Henker et al. |
| 2013/0241237 A1 | 9/2013 | Dziuba et al. |
| 2013/0249175 A1 | 9/2013 | Ellifson |
| 2013/0249183 A1 | 9/2013 | Ellifson et al. |
| 2013/0263729 A1 | 10/2013 | Johnson et al. |
| 2013/0264784 A1 | 10/2013 | Venton-Walters et al. |
| 2013/0312595 A1 | 11/2013 | Lee |
| 2014/0035325 A1 | 2/2014 | Naito et al. |
| 2014/0060304 A1 | 3/2014 | Harmon et al. |
| 2014/0131969 A1 | 5/2014 | Rowe et al. |
| 2014/0151142 A1 | 6/2014 | Hoppe et al. |
| 2014/0232082 A1 | 8/2014 | Oshita et al. |
| 2014/0251742 A1 | 9/2014 | Dillman et al. |
| 2014/0255136 A1 | 9/2014 | Malcolm et al. |
| 2014/0262591 A1 | 9/2014 | Turner et al. |
| 2014/0265203 A1 | 9/2014 | Zuleger et al. |
| 2014/0291945 A1 | 10/2014 | Venton-Walters et al. |
| 2014/0326555 A1 | 11/2014 | Ellifson et al. |
| 2015/0028529 A1 | 1/2015 | Ellifson |
| 2015/0191069 A1 | 7/2015 | Zuleger et al. |
| 2015/0197129 A1 | 7/2015 | Venton-Walters et al. |
| 2015/0224847 A1 | 8/2015 | Rowe et al. |
| 2015/0283889 A1 | 10/2015 | Agnew |
| 2015/0306954 A1 | 10/2015 | Matsuura et al. |
| 2016/0009231 A1 | 1/2016 | Perron et al. |
| 2016/0047631 A1 | 2/2016 | Berman |
| 2016/0144211 A1 | 5/2016 | Betz et al. |
| 2016/0167475 A1 | 6/2016 | Ellifson et al. |
| 2016/0208883 A1 | 7/2016 | Dillman et al. |
| 2016/0257360 A1 | 9/2016 | MacKenzie et al. |
| 2016/0304051 A1 | 10/2016 | Archer et al. |
| 2016/0347137 A1 | 12/2016 | Despres-Nadeau et al. |
| 2016/0368432 A1 | 12/2016 | Perron et al. |
| 2016/0375805 A1 | 12/2016 | Krueger et al. |
| 2017/0028844 A1 | 2/2017 | Melone et al. |
| 2017/0137076 A1 | 5/2017 | Perron et al. |
| 2017/0253221 A1 | 9/2017 | Verhoff et al. |
| 2017/0259666 A1 | 9/2017 | Weber et al. |
| 2017/0267052 A1 | 9/2017 | Zuleger et al. |
| 2017/0282670 A1 | 10/2017 | Venton-Walters et al. |
| 2017/0291802 A1 | 10/2017 | Hao et al. |
| 2017/0291805 A1 | 10/2017 | Hao et al. |
| 2017/0297425 A1 | 10/2017 | Wildgrube et al. |
| 2017/0328054 A1 | 11/2017 | Bakken |
| 2017/0355400 A1 | 12/2017 | Weston |
| 2017/0361491 A1 | 12/2017 | Datema et al. |
| 2017/0361492 A1 | 12/2017 | Datema et al. |
| 2018/0001839 A1 | 1/2018 | Perron et al. |
| 2018/0056746 A1 | 3/2018 | Ellifson et al. |
| 2018/0162704 A1 | 6/2018 | Hao et al. |
| 2018/0222481 A1 | 8/2018 | Okada et al. |
| 2018/0222484 A1 | 8/2018 | Shively et al. |
| 2018/0326843 A1 | 11/2018 | Danielson et al. |
| 2018/0335104 A1 | 11/2018 | Dillman et al. |
| 2019/0039407 A1 | 2/2019 | Smith |
| 2019/0106083 A1 | 4/2019 | Archer et al. |
| 2019/0118875 A1 | 4/2019 | Perron et al. |
| 2019/0145465 A1 | 5/2019 | Olason |
| 2019/0185077 A1 | 6/2019 | Smith et al. |
| 2019/0185301 A1 | 6/2019 | Hao et al. |
| 2019/0276102 A1 | 9/2019 | Zuleger et al. |
| 2019/0316650 A1 | 10/2019 | Dillman et al. |
| 2019/0322321 A1 | 10/2019 | Schwartz et al. |
| 2019/0337348 A1 | 11/2019 | Oshkosh |
| 2019/0337350 A1 | 11/2019 | Ellifson et al. |
| 2019/0344475 A1 | 11/2019 | Datema et al. |
| 2019/0344838 A1 | 11/2019 | Perron et al. |
| 2019/0351883 A1 | 11/2019 | Verhoff et al. |
| 2019/0352157 A1 | 11/2019 | Hao et al. |
| 2019/0355339 A1 | 11/2019 | Seffernick et al. |
| 2020/0062071 A1 | 2/2020 | Zuleger et al. |
| 2020/0094671 A1 | 3/2020 | Wildgrube et al. |
| 2020/0223276 A1 | 7/2020 | Rositch et al. |
| 2020/0223277 A1 | 7/2020 | Zhang et al. |
| 2020/0232533 A1 | 7/2020 | Dillman et al. |
| 2020/0254840 A1 | 8/2020 | Rositch et al. |
| 2020/0290237 A1 | 9/2020 | Steffens et al. |
| 2020/0291846 A1 | 9/2020 | Steffens et al. |
| 2020/0316816 A1 | 10/2020 | Messina et al. |
| 2020/0317083 A1 | 10/2020 | Messina et al. |
| 2020/0346547 A1 | 11/2020 | Rocholl et al. |
| 2020/0346855 A1 | 11/2020 | Rocholl et al. |
| 2020/0346857 A1 | 11/2020 | Rocholl et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0391569 A1 | 12/2020 | Zuleger |
| 2020/0399107 A1 | 12/2020 | Buege et al. |
| 2021/0031611 A1 | 2/2021 | Yakes et al. |
| 2021/0031612 A1 | 2/2021 | Yakes et al. |
| 2021/0031649 A1 | 2/2021 | Messina et al. |
| 2021/0107361 A1 | 4/2021 | Linsmeier et al. |
| 2021/0213642 A1 | 7/2021 | Datema et al. |
| 2021/0221190 A1 | 7/2021 | Rowe |
| 2021/0221216 A1 | 7/2021 | Yakes et al. |
| 2021/0225349 A1 | 7/2021 | Seffernick et al. |
| 2021/0229755 A1 | 7/2021 | Schwartz et al. |
| 2021/0380085 A1 | 12/2021 | Verhoff et al. |
| 2022/0176921 A1 | 6/2022 | Verhoff et al. |
| 2022/0194333 A1 | 6/2022 | Verhoff et al. |
| 2022/0194334 A1 | 6/2022 | Verhoff et al. |

FOREIGN PATENT DOCUMENTS

| | | | |
|---|---|---|---|
| CA | 2724324 | | 11/2009 |
| CA | 2809527 A1 | | 9/2013 |
| CA | 2852786 A1 | | 11/2013 |
| CN | 201371806 Y | * | 12/2009 |
| CN | 201463718 U | * | 5/2010 ............... F41H 7/02 |
| DE | 11 86 334 | | 1/1965 |
| DE | 36 20 603 A1 | | 1/1987 |
| DE | 10 2008 062 340 A1 | | 6/2010 |
| DE | 10 2008 052 072 B4 | | 4/2011 |
| EP | 0 685 382 A1 | | 12/1995 |
| EP | 1 229 636 A2 | | 8/2002 |
| EP | 1 633 619 B1 | | 6/2004 |
| EP | 1 371 391 B1 | | 12/2009 |
| EP | 2 413 089 A2 | | 2/2012 |
| FR | 1471914 A | | 3/1967 |
| FR | 2380176 A1 | | 9/1978 |
| GB | 2 168 015 A0 | | 6/1986 |
| GB | 2 365 829 | | 9/2004 |
| GB | 2 400 588 A | | 1/2005 |
| GB | 2 400 589 A | | 2/2005 |
| GB | 2 400 590 A | | 3/2005 |
| GB | 2 545 187 A | | 6/2017 |
| HK | 1088583 | | 10/2007 |
| JP | 4230421 B2 | | 8/1992 |
| JP | 06-037090 | | 5/1994 |
| JP | 2906249 B2 | | 6/1999 |
| JP | 2005-007995 A | | 1/2005 |
| JP | 2005-212698 A | | 8/2005 |
| JP | 2006-056463 A | | 3/2006 |
| JP | 2012-096557 A | | 5/2012 |
| WO | WO-91/08939 A1 | | 6/1991 |
| WO | WO-01/76912 A1 | | 10/2001 |
| WO | WO-03/049987 A2 | | 6/2003 |
| WO | WO-2007/140179 A2 | | 12/2007 |
| WO | WO-2015/061840 A1 | | 5/2015 |

OTHER PUBLICATIONS

U.S. Appl. No. 14/532,679, filed Nov. 4, 2014.
U.S. Appl. No. 29/680,745, filed Feb. 19, 2019.

(56) References Cited

OTHER PUBLICATIONS

U.S. Appl. No. 29/683,330, filed Mar. 12, 2019.
U.S. Appl. No. 29/683,333, filed Mar. 12, 2019.
U.S. Appl. No. 29/700,665, filed Aug. 5, 2019.
U.S. Appl. No. 29/706,533, filed Sep. 20, 2019.
U.S. Appl. No. 29/706,547, filed Sep. 20, 2019.
"Military Troop Transport Truck." Sep. 14, 2012. Deviant Art. https://www.deviantart.com/shitalloverhumanity/art/Military-Troop-Transport-Truck-327166456.
"New Oshkosh JL TV Next to an Old Humvee." May 2, 2017. Reddil. https://www.reddil.com/r/MilitaryPorn/comments/8jflee/new_oshkoshjltv_next_to_an_old_humvee_hmmwv_may/.
"Troop Transport Truck Tutorial." Jun. 13, 2009. Dave Taylor Miniatures. http://davetaylorminiatures.blogspot.com/2009/06/troop-transport-truck-tutorial-part-one.html.
1953-56 Ford F100 Pickup 3 Inch Wider Right Rear Fenders. 1956. eBay. https://www.ebay.com/p/710218145.
2019 Nissan NV1500 Cargo Consumer Reviews, Kelley Blue Book, Apr. 14, 2021, 12 pages, https://ww.kbb.com/nissan/nv1500-cargo/2019/consumer-reviews/.
Feeburg, Elisabet. "Mine-Resistant, Ambush-Protected All-Terrain Vehcile", 2009. Britannica, https://www.britannica.com/technology/armoured-vehicle/Wheeled-armoured-vehicles.
Grille Designs, Questel, orbit.com, Retrieved Apr. 14, 2021, 26 pages.
https://www.army-technology.com/news/newslenco-bear-troop-transport-armoured-vehicle/"Lenco Completes Blast Test for BEAR Troop Transport Armoured Vehicle." Aug. 16, 2013. Army Technology.
Huddleston, Scott. "Fortified Tactical Vehicle Offered to Replace Military Humvee." Jan. 4, 2014. My San Antonio. https:// www.mysanantonio.com/news/local/military/article/Fortified-tactical-vehicle-offered-to-replace-5109387 .php#photo-5673528.
Iriarte, Mariana. "Power Distribution from the Ground Up." Nov. 9, 2016. Military Embedded Systems. https://militaryembedded.com/comms/communications/power-distribution-the-ground-up.
MD Juan CFA005 Front Fender for 52-75 Jeep. 1975. Quadratec. https://quadratec.com/p/md-juan/front-fender-cj5-cj6-m38a1.
Miller, Stephen W., "The MRAP Story: Learning from History", Asian Military Review, Oct. 30, 2018, 9 pages.
Rear Fender Fiberglass Pick Up Truck 1947-1963. 1963. Walck's 4 Wheel Drive. https://walcks4wd,com/Rear-Fender-Fiberglass-Pick-Up-Truck-1947-1963_p_1780.html.
Vehicle fenders. (Design—Questel) orbit.com. [Online PDF complication of references selected by examiner] 34 pgs. Print Dates Range Apr. 14, 2022-Nov. 8, 2019 [Retrieved Nov. 18, 2022].
Vehicle Headlights. (Design—?Questel) orbit.com. [online PDF] 38 pgs. Print Dates Range Mar. 19, 2021-May 23, 2019 [Retrieved Apr. 23, 2021].
Vehicle Hood (Design—Questel) orbit.com. [Online PDF compilation of references selected by examiner] 42 pgs. Print Dates Range Mar. 24, 2021-Jul. 22, 2020 [Retrieved Dec. 13, 2021].
How the U.S. military plans to replace the iconic Humvee. Aug. 13, 2021. CNBC. https://www.cnbc.com/2021/08/13/how-the-us-military-plans-to-replace-the-iconic-humvee.html.
Oshkosh Defense Highlights Advanced Technology Capabilities At Modern Day Marine 2022. May 10, 2022. Oshkosh Defense. https://oshkoshdefense.com/oshkosh-defense-highlights-advanced-technology-capabilities-at-modern-day-marine-2022/.
US Army Contradictions Muddy Humvee-Replacement Plan. Mar. 21, 2019. Defense One. https://www.defenseone.com/business/2019 /03/us-armys-contradictory-statements-leave-jltv-plan-unclear/155707/.
Jen Judson, "Oshkosh unveils hybrid electric Joint Light Tactical Vehicle". Jan. 25, 2022. Defense News. https://www.defensenews.com/land/2022/01/25/oshkosh-unveils-hybrid-electric-joint-light-tactical-vehicle/.
Staff Sgt. Tawny Kruse, "A vehicle of the future Iowa training center receives new tactical vehicles". May 7, 2023. DVIDS. https://www.dvidshub.neUnews/ 448328/vehicle-future-iowa-training-center-receives-new-tactical-vehicles.
Todd South, "The newly fielded Joint Light Tactical Vehicle was briefly deemed 'not operationally suitable'". Feb. 22, 2019. Army Times. https:// www.armytimes.com/news/your -army/2019/02/22/the-newly-fielded-joint-light-tactical-vehicle-is-not-operationally-suitable/.

\* cited by examiner

MILITARY VEHICLE

CROSS-REFERENCE TO RELATED PATENT APPLICATIONS

This application is a continuation of U.S. patent application Ser. No. 17/748,589, filed May 19, 2022, which is continuation of U.S. patent application Ser. No. 17/462,595, filed Aug. 31, 2021, which is a continuation of U.S. patent application Ser. No. 16/529,508, filed Aug. 1, 2019, which is a continuation of U.S. patent application Ser. No. 15/599, 174, filed May 18, 2017, which is a continuation of U.S. patent application Ser. No. 14/724,279, filed May 28, 2015, which is a continuation of U.S. patent application Ser. No. 13/841,686, filed Mar. 15, 2013, which claims the benefit of U.S. Provisional Patent Application No. 61/615,812, filed Mar. 26, 2012, all of which are incorporated herein by reference in their entireties.

BACKGROUND

The present application relates to vehicles. In particular, the present application relates to the structural frame assembly of a military vehicle.

A military vehicle may be used in a variety of applications and conditions. These vehicles generally include a number of vehicle systems or components (e.g., a cab or body, a drive train, etc.). The military vehicle may also include various features and systems as needed for the specific application of the vehicle (e.g., a hatch, a gun ring, an antenna, etc.). Proper functioning and arrangement of the vehicle systems or components is important for the proper functioning of the vehicle.

Traditional military vehicles include a cab assembly coupled to a pair of frame rails that extend along the length of the vehicle. The drive train, engine, and other components of the vehicle are coupled to the frame rails. Such vehicles may be transported by securing lifting slings to the frame rails and applying a lifting force (e.g., with a crane, with a helicopter, etc.). As the frame rails are the primary structure of the vehicle, a lifting force applied to a rear portion and a front portion elevate the vehicle from a ground surface. In such a configuration, the components of the vehicle must be coupled to the structural frame rails thereby requiring sequential assembly.

SUMMARY

One embodiment relates to a military vehicle. The military vehicle includes a passenger capsule and a brake system. The brake system includes a brake housing defining an inner volume, a piston separating the inner volume into a first chamber and a second chamber, a rod extending through an end of the brake housing and coupled to the piston where the rod is positioned to selectively engage with a brake to inhibit movement of a tractive element, a resilient member positioned within the inner volume and configured to generate a brake biasing force against the piston such that the rod is biased into engagement with the brake, an air-to-hydraulic intensifier coupled to the brake housing, the air-to-hydraulic intensifier configured to receive a supply of air and provide a hydraulic fluid to the brake housing based on the supply of air to overcome the brake biasing force to disengage the rod from the brake to permit movement of the tractive element, a hydraulic reservoir, and a valve positioned between the air-to-hydraulic intensifier, the brake housing, and the hydraulic reservoir.

Another embodiment relates to a military vehicle. The military vehicle includes a brake system and a passenger capsule. The passenger capsule defines a front door aperture, a rear door aperture, and an interlocking door frame portion positioned along and protruding outward from an exterior of the passenger capsule between the front door aperture and the rear door aperture. The passenger capsule includes (i) a front door positioned to selectively enclose the front door aperture and (ii) a rear door positioned to selectively enclose the rear door aperture. The front door and the rear door selectively engage with the interlocking door frame portion when closed.

Still another embodiment relates to a brake system. The brake system includes an air-to-hydraulic intensifier configured to couple to a brake actuator that engages a brake to limit movement of a tractive element where the air-to-hydraulic intensifier is configured to receive a supply of air and provide a hydraulic fluid to the brake actuator based on the supply of air to overcome a brake biasing force of the brake actuator to disengage the brake actuator from the brake to permit movement of the tractive element, a hydraulic reservoir coupled to the air-to-hydraulic intensifier, and a valve positioned between the air-to-hydraulic intensifier, the brake actuator, and the hydraulic reservoir. The valve includes a first port fluidly coupled to the air-to-hydraulic intensifier, a second port fluidly coupled to the hydraulic reservoir, a third port fluidly coupled to the brake actuator, and a valve gate that is repositionable between a first position and a second position. The first position couples the first port to the third port to fluidly couple the air-to-hydraulic intensifier to the brake actuator. The second position couples the second port to the third port to fluidly couple the hydraulic reservoir to the brake actuator.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
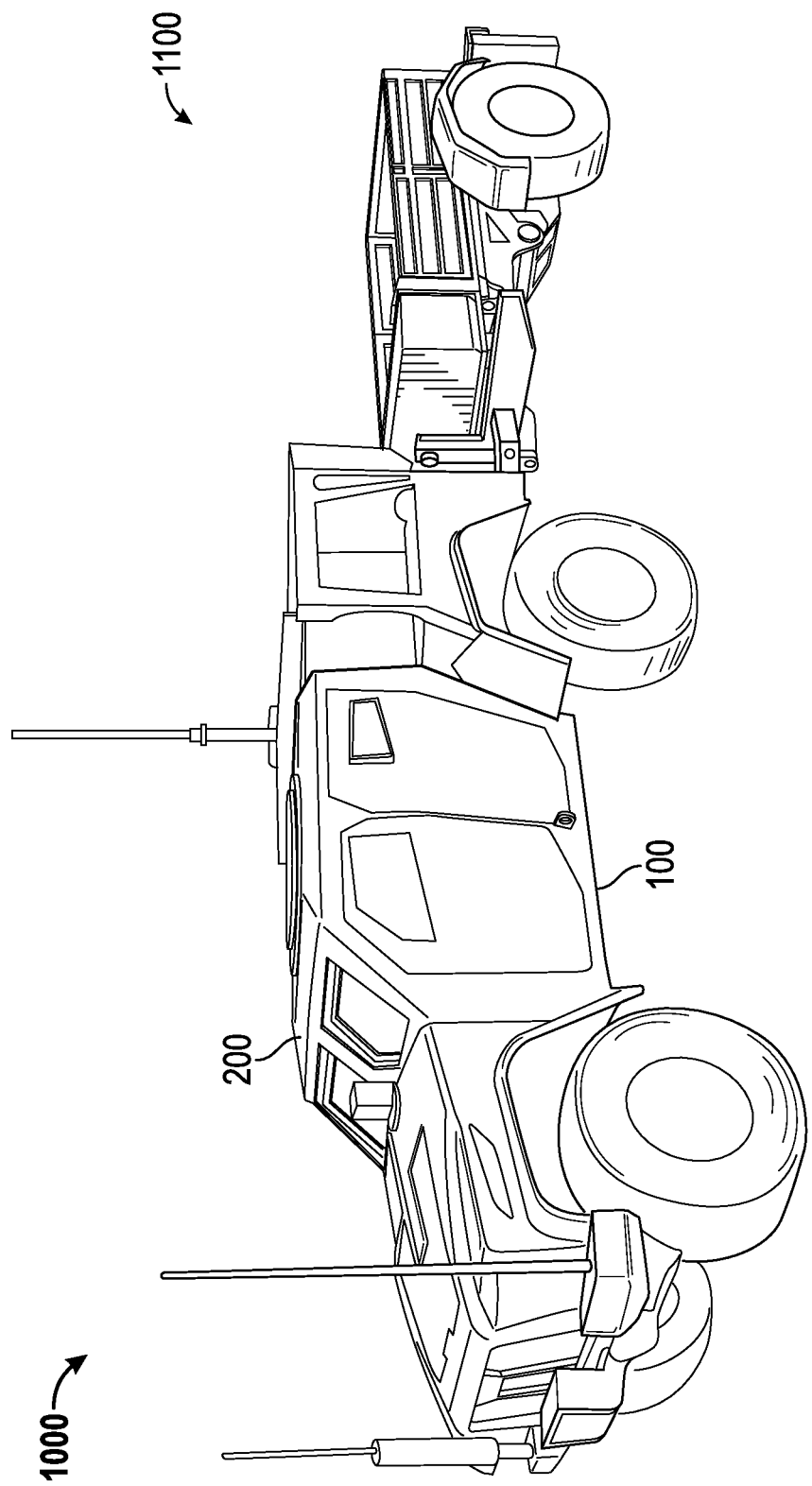
FIGS. 1-2 are a perspective views of a vehicle, according to an exemplary embodiment.
Figure 2:
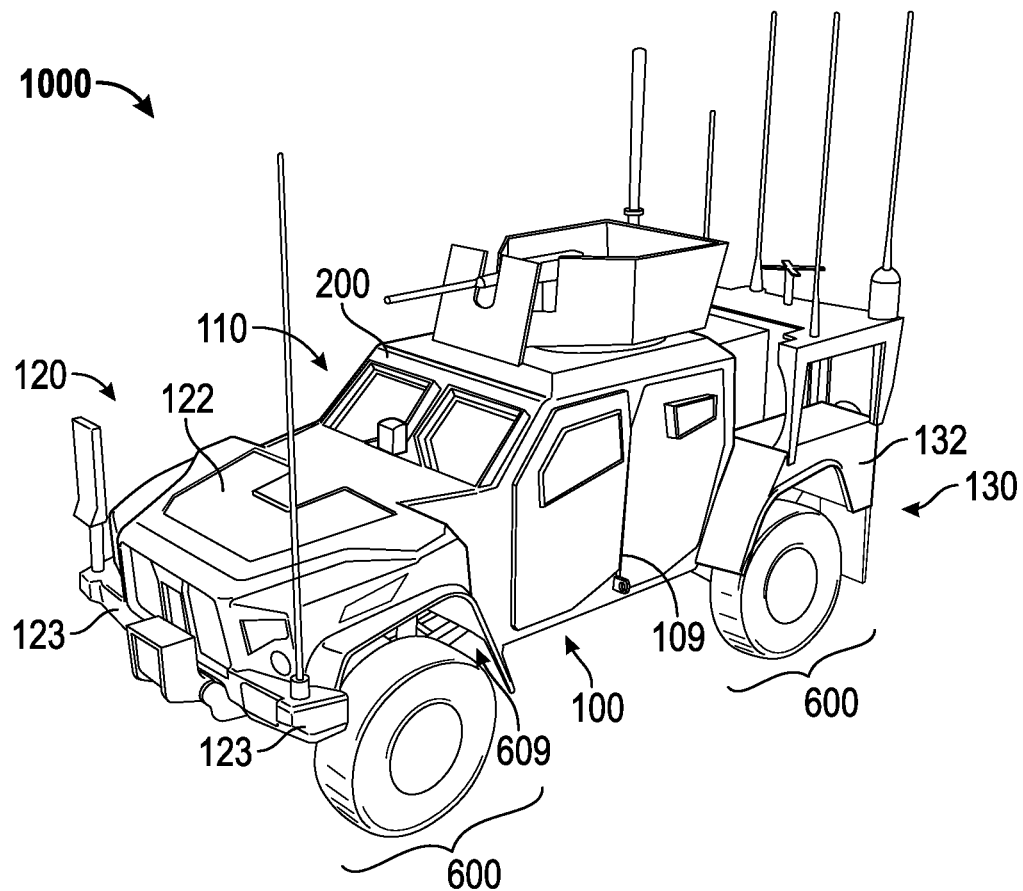
Figure 3:
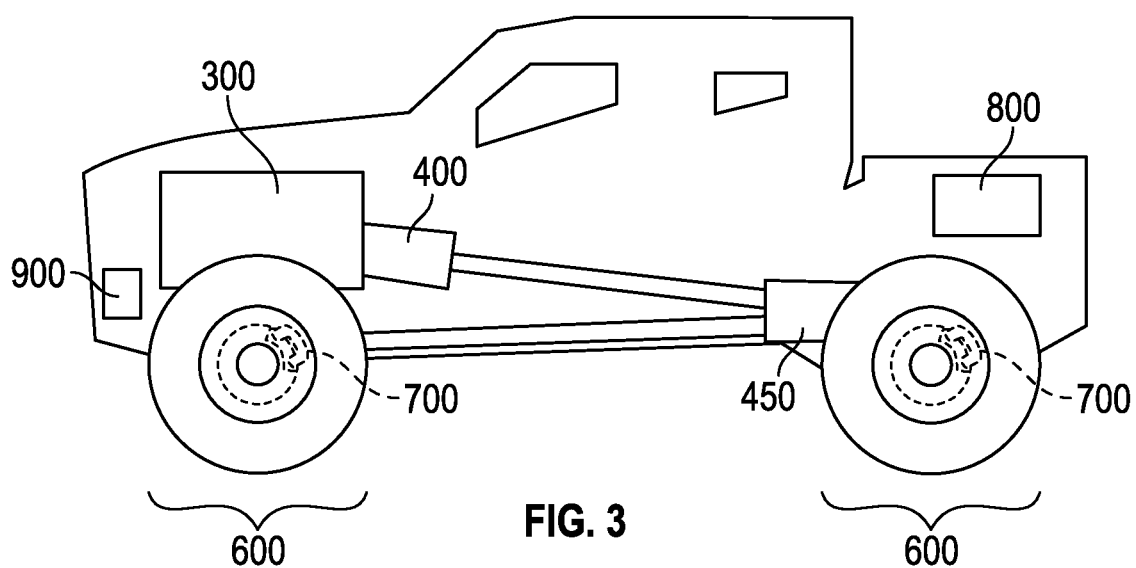
FIG. 3 is a schematic side view of the vehicle of FIG. 1, according to an exemplary embodiment.

Referring to FIGS. 1-3, a military vehicle 1000 includes a hull and frame assembly 100, an armor assembly 200, an engine 300, a transmission 400, a transaxle 450, wheel and tire assemblies 600, a braking system 700, a fuel system 800, and a suspension system 460 coupling the hull and frame assembly 100 to the wheel and tire assemblies 600. According to an exemplary embodiment, the military vehicle 1000 includes a power generation system 900. As shown in FIG. 1, the military vehicle 1000 also includes a trailer 1100.

Hull and Frame Assembly

Referring to FIG. 2, the hull and frame assembly 100 includes a passenger capsule, shown as passenger capsule 110, a front module, shown as front module 120, and a rear module, shown as rear module 130. According to an exemplary embodiment, the front module 120 and the rear module 130 are coupled to the passenger capsule 110 with a plurality of interfaces. As shown in FIG. 2, the front module 120 includes a front axle having wheel and tire assemblies 600.

According to an exemplary embodiment, the rear module 130 includes a body assembly, shown as bed 132. As shown in FIG. 2, front module 120 also includes a body panel, shown as hood 122. In some embodiments, the hood 122 partially surrounds the engine of military vehicle 1000. The hood 122 is constructed of a composite material (e.g., carbon fiber, fiberglass, a combination of fiberglass and carbon fiber, etc.) and sculpted to maximize vision and clear under-hood components. According to an alternative embodiment, the hood 122 is manufactured from another material (e.g., steel, aluminum, etc.). The front portion of hood 122 mounts to a lower cooling package frame, and the upper mount rests on the windshield wiper cowl. This mounting configuration reduces the number and weight of components needed to mount the hood 122. The Oshkosh Corporation® logo is mounted to a frame structure, which is itself mounted directly to the cooling package. The hood 122 includes bumperettes 123 that provide mounting locations for antennas (e.g., a forward-facing IED jammer, a communications whip antenna, etc.). In one embodiment, the bumperettes 123 and front of the hood 122 may be reinforced (e.g., with structural fibers, structural frame members, etc.) to become structural members intended to prevent damage to the tire assemblies 600. In an alternative embodiment, the bumperettes 123 may be crushable members or "break away" members that disengage upon impact to prevent interference between the bumperettes 123 and tire assemblies 600 in the event of a front impact.

Figure 4:
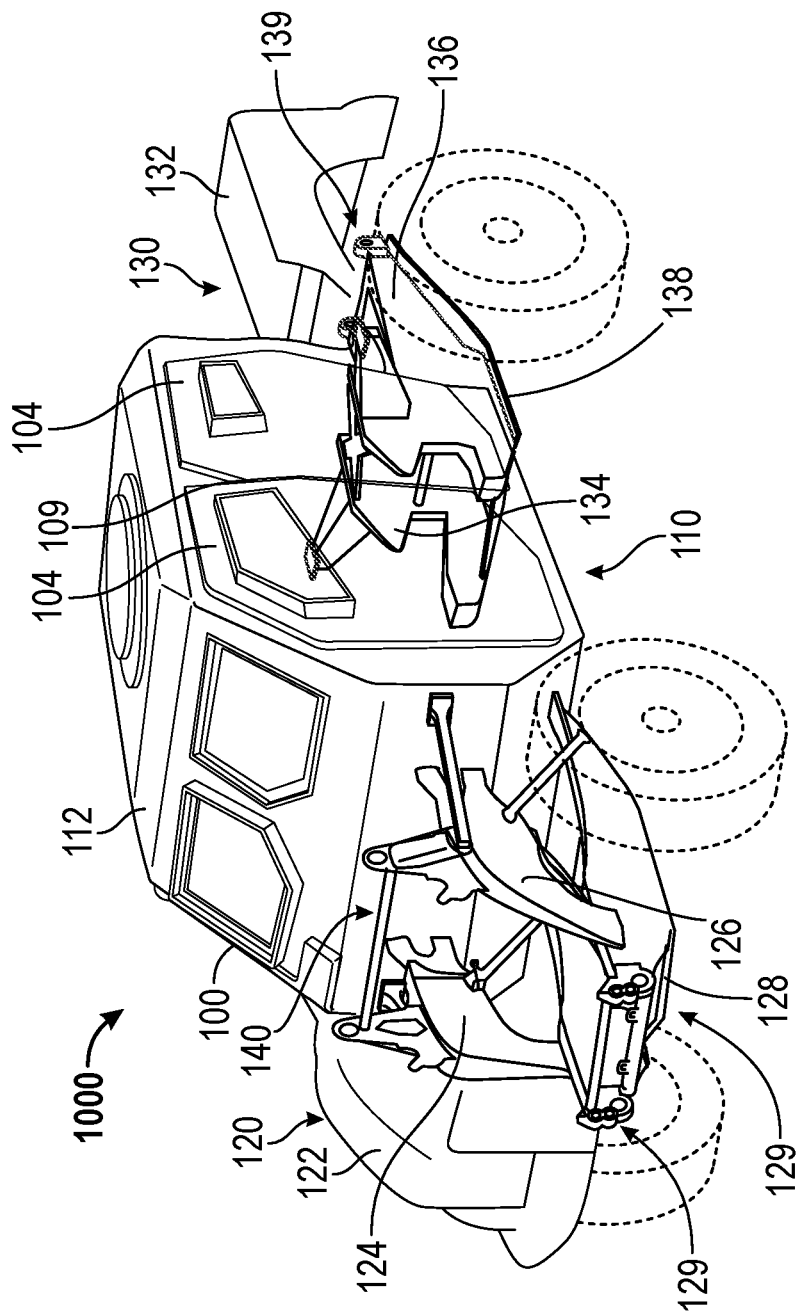
FIGS. 4-6 are perspective views of a vehicle having a passenger capsule, a front module, and a rear module, according to an exemplary embodiment.
Figure 5:
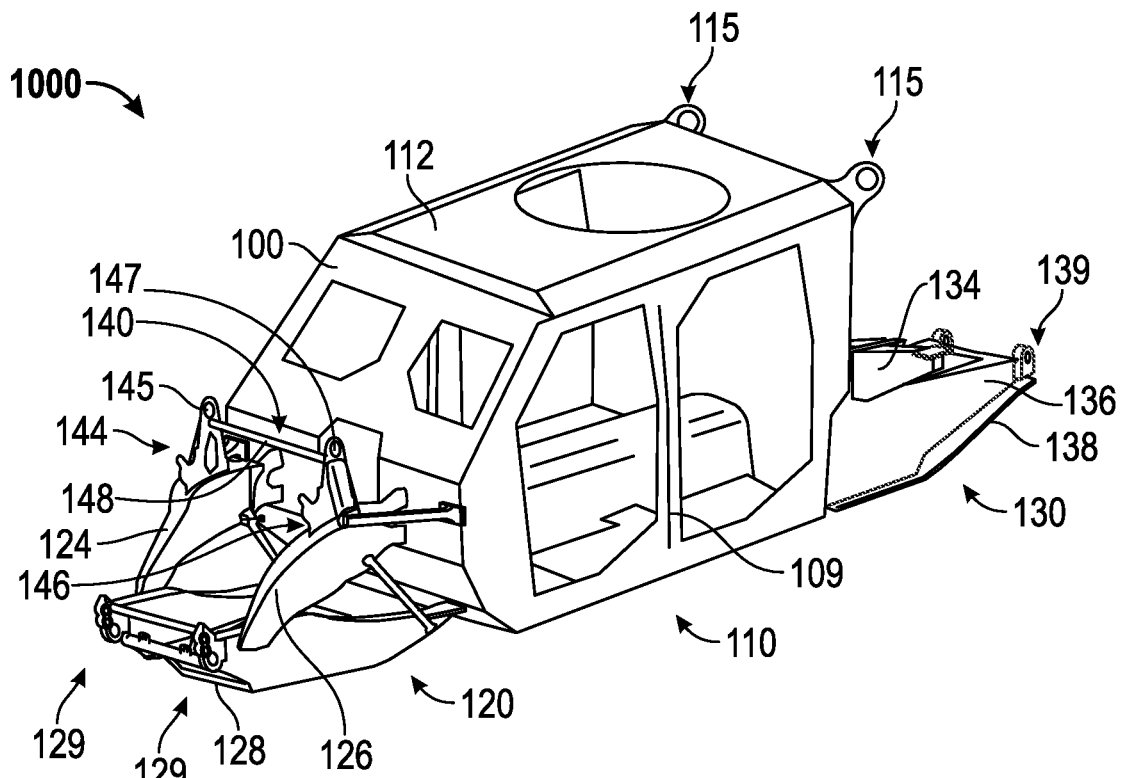
Figure 6:
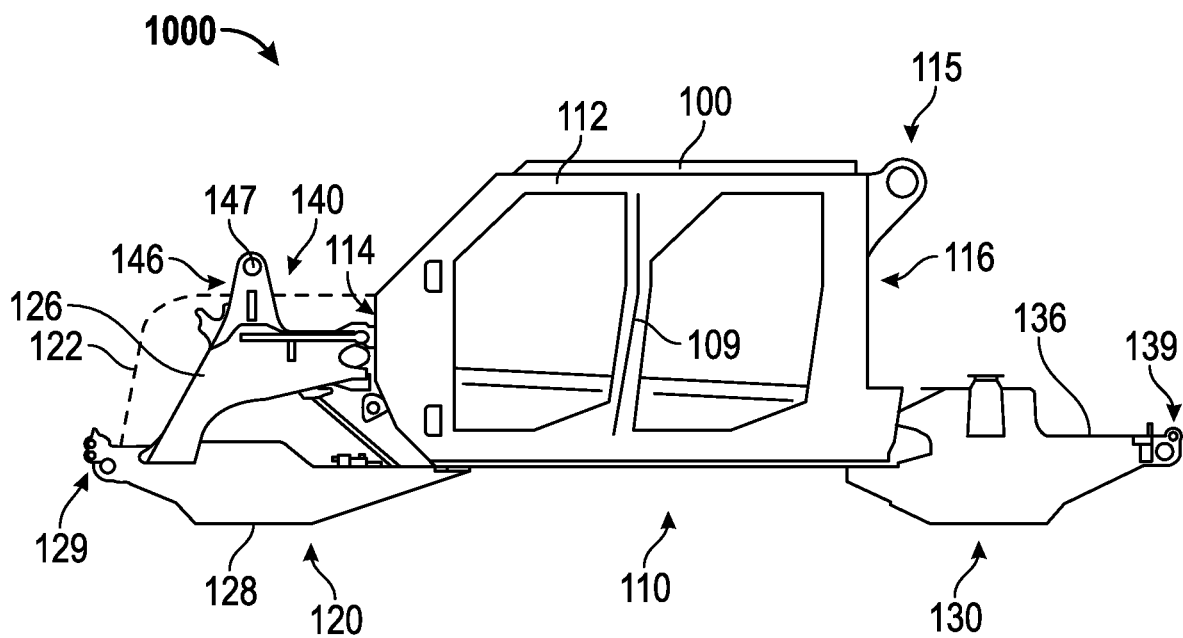
Figure 7:
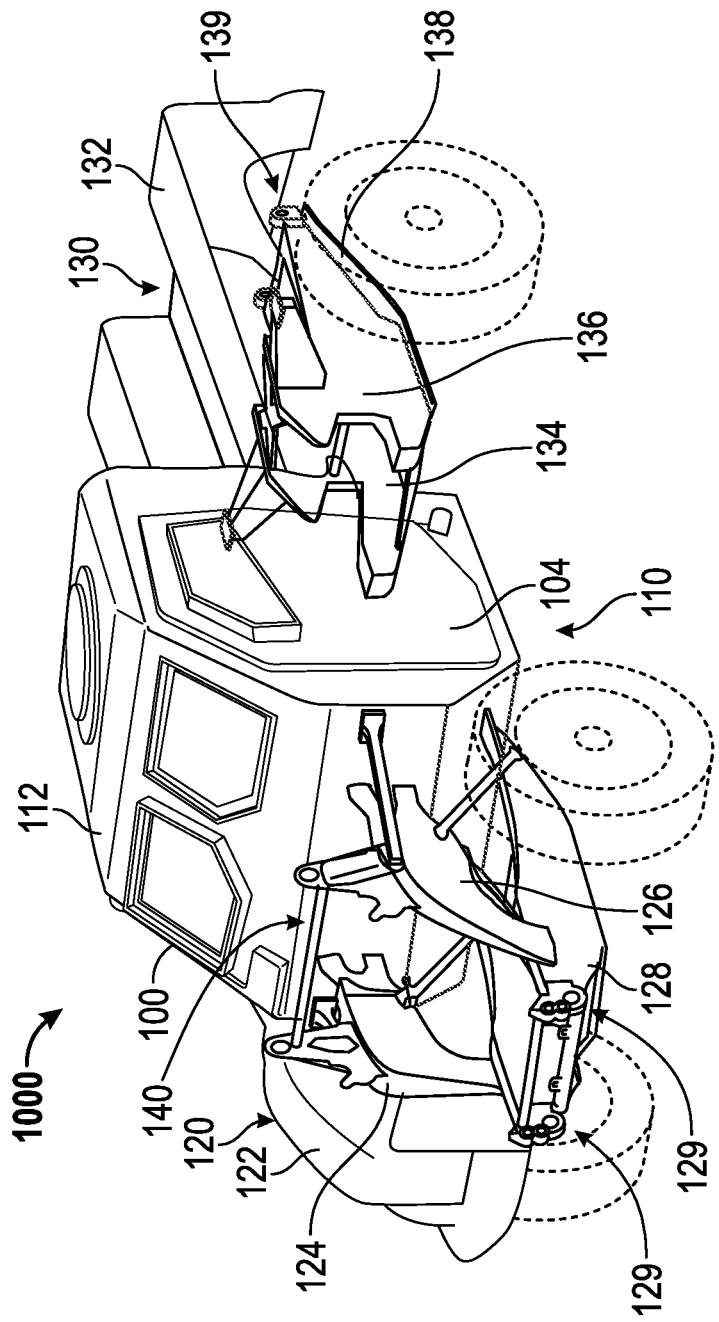
FIGS. 7-9 are perspective views of a vehicle having a passenger capsule, a front module, and a rear module, according to an alternative embodiment.
Figure 8:
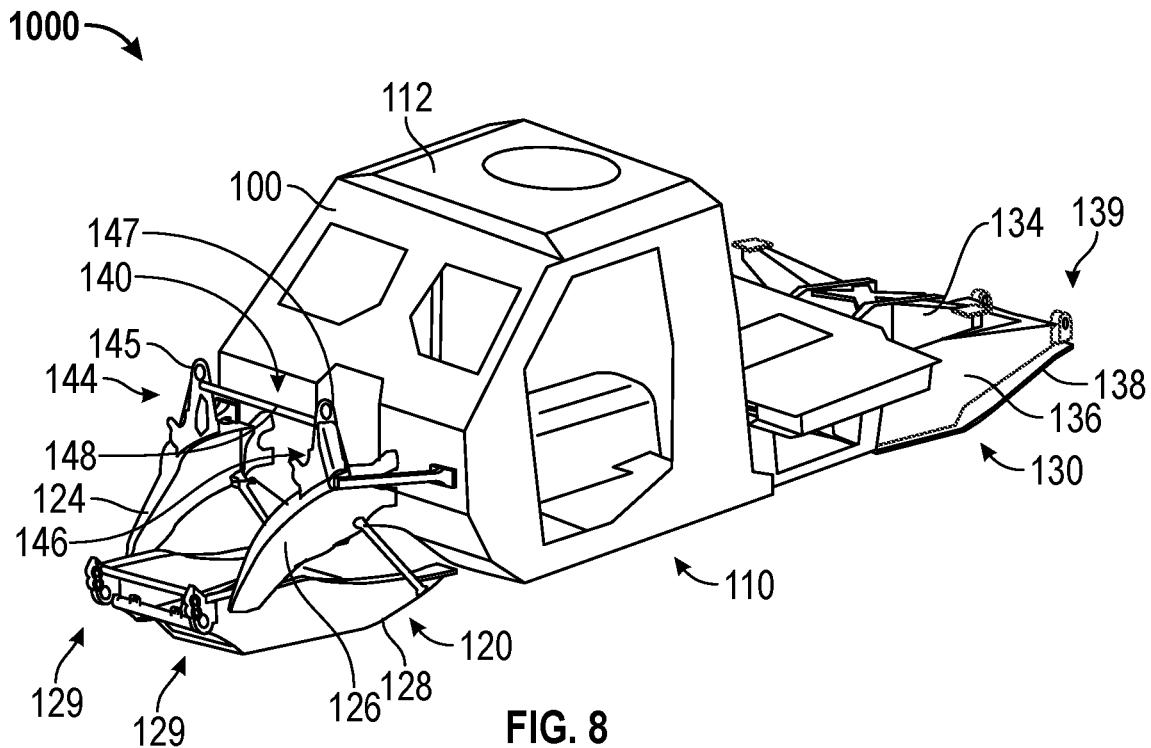
Figure 9:
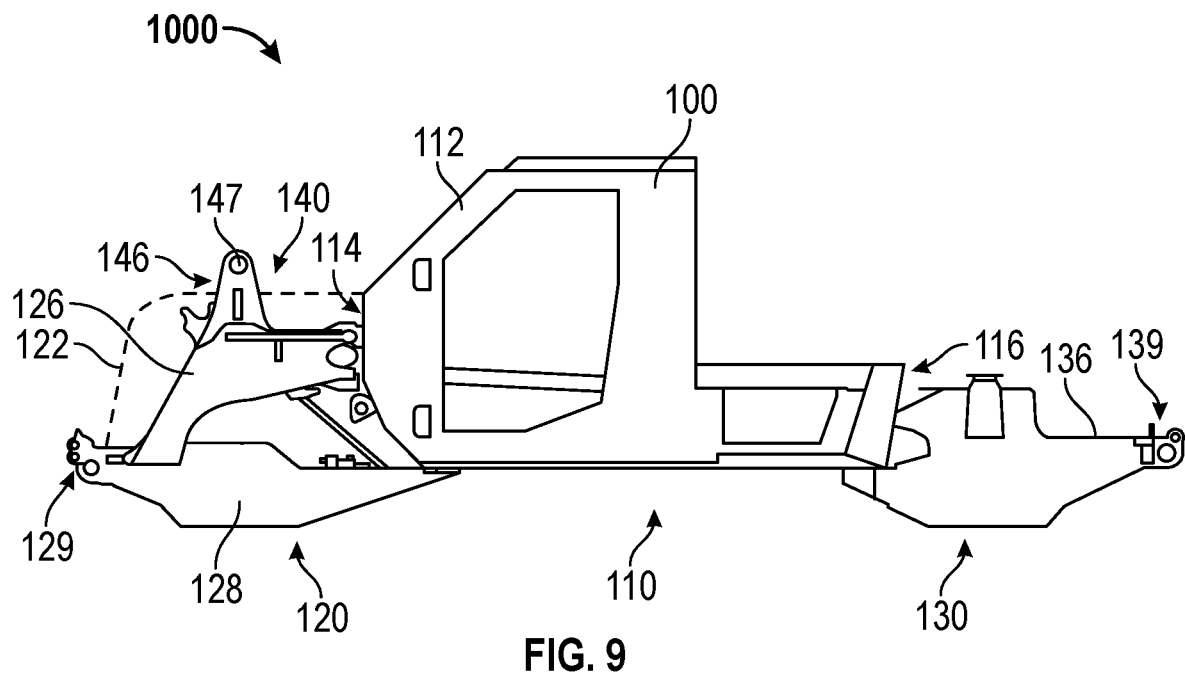

Referring next to the exemplary embodiment shown in FIGS. 4-9, the military vehicle 1000 includes passenger capsule 110, front module 120, and rear module 130. As shown in FIGS. 4 and 7, passenger capsule 110 includes a structural shell 112 that forms a monocoque hull structure. Monocoque refers to a form of vehicle construction in which the vehicle body and chassis form a single unit. The structural shell 112 is configured to provide a structural load path between front module 120 and rear module 130 of military vehicle 1000 (e.g., during driving, a lifting operation, during a blast event, etc.). According to an exemplary embodiment, the structural shell 112 includes a plurality of integrated armor mounting points configured to engage a supplemental armor kit (e.g., a "B-Kit," etc.). The structural shell 112 is rigidly connected to the rest of the powertrain, drivetrain, suspension, and major systems such that they all absorb blast energy during a blast event, according to an exemplary embodiment. According to an exemplary embodiment, the structural shell 112 is large enough to contain four-passengers in a standard two-by-two seating arrangement and four doors 104 are rotatably mounted to the structural shell 112. According to the alternative embodiment shown in FIGS. 7-9, two doors 104 are coupled to structural shell 112. Front module 120 and rear module 130 are configured to engage a passenger capsule having either two doors or four doors, according to an exemplary embodiment. As shown in FIGS. 6 and 9, the structural shell 112 includes a first end 114 and a second end 116.

According to an exemplary embodiment, front module 120 includes a subframe having a first longitudinal frame member 124 and a second longitudinal frame member 126. As shown in FIGS. 4-9, an underbody support structure 128 is coupled to the first longitudinal frame member 124 and the second longitudinal frame member 126. According to an exemplary embodiment, the first longitudinal frame member 124 and the second longitudinal frame member 126 extend within a common plane (e.g., a plane parallel to a ground surface). The underbody support structure 128 is coupled to the first end 114 of structural shell 112 and includes a plurality of apertures 129 that form tie down points. In some embodiments, an engine for the military vehicle 1000 is coupled to the first longitudinal frame member 124 and the second longitudinal frame member 126. In other embodiments, the front module 120 includes a front axle assembly coupled to the first longitudinal frame member 124 and the second longitudinal frame member 126.

As shown in FIGS. 4 and 6, rear module 130 includes a subframe having a first longitudinal frame member 134 and a second longitudinal frame member 136. As shown in FIGS. 4-9, an underbody support structure 138 is coupled to the first longitudinal frame member 134 and the second longitudinal frame member 136. According to an exemplary embodiment, the first longitudinal frame member 134 and the second longitudinal frame member 136 extend within a common plane (e.g., a plane parallel to a ground surface). The underbody support structure 138 is coupled to the second end 116 of structural shell 112, the first longitudinal frame member 134, and the second longitudinal frame member 136. According to an exemplary embodiment, the first longitudinal frame member 134 and the second longitudinal frame member 136 include a plurality of apertures 139 that form tie down points. In some embodiments, a transaxle 450 or a differential for the military vehicle 1000 is coupled to at least one of the first longitudinal frame member 134 and the second longitudinal frame member 136. In other embodiments, the rear module 130 includes a rear axle assembly coupled to the first longitudinal frame member 134 and the second longitudinal frame member 136.

The subframes of the front module 120 and the rear module 130 may be manufactured from High Strength Steels (HSS), high strength aluminum, or another suitable material. According to an exemplary embodiment, the subframes feature a tabbed, laser cut, bent and welded design. In other embodiments, the subframes may be manufactured from tubular members to form a space frame. The subframe may also include forged, rather than fabricated or cast frame sections to mitigate the stress, strains, and impact loading imparted during operation of military vehicle 1000. Aluminum castings may be used for various cross member components where the loading is compatible with material properties. Low cost aluminum extrusions may be used to tie and box structures together.

The structural shell 112 and the subframes of the front module 120 and the rear module 130 are integrated into the hull and frame assembly 100 to efficiently carry chassis loading imparted during operation of the military vehicle 1000, during a lift event, during a blast event, or under still other conditions. During a blast event, conventional frame rails can capture the blast force transferring it into the vehicle. Military vehicle 1000 replaces conventional frame rails and instead includes passenger capsule 110, front module 120, and rear module 130. The passenger capsule 110, front module 120, and rear module 130 provides a vent for the blast gases (e.g., traveling upward after the tire triggers an IED) thereby reducing the blast force on the structural shell 112 and the occupants within passenger capsule 110. Traditional frame rails may also directly impact (i.e. contact, engage, hit, etc.) the floor of traditional military vehicles. Military vehicle 1000 that includes passenger capsule 110, front module 120, and rear module 130 does not include traditional frame rails extending along the vehicle's length thereby eliminating the ability for such frame rails to impact the floor of the passenger compartment. Military vehicle 1000 that includes a passenger capsule 110, front module 120, and rear module 130 also has an improved strength-to-weight performance, abuse tolerance, and life-cycle durability.

According to an exemplary embodiment, the doors 104 incorporate a combat lock mechanism. In some embodiments, the combat lock mechanism is controlled through the same handle that operates the automotive door latch system, allowing a passenger to release the combat locks and automotive latches in a single motion for quick egress. The doors 104 also interface with an interlocking door frame 109 defined within structural shell 112 adjacent to the latch, which helps to keep the doors 104 closed and in place during a blast even. Such an arrangement also distributes blast forces between a front and a rear door mounting and latching mechanism thereby improving door functionality after a blast event.

Lift Structure

According to an exemplary embodiment, the military vehicle 1000 may be transported from one location to another in an elevated position with respect to a ground surface (e.g., during a helicopter lift operation, for loading onto or off a ship, etc.). As shown in FIGS. 4-9, military vehicle 1000 includes a lift structure 140 coupled to the front module 120. According to an exemplary embodiment, the lift structure includes a first protrusion 144 extending from the first longitudinal frame member 124, a second protrusion 146 coupled to the second longitudinal frame member 126, and a lateral frame member 148 extending between the first protrusion 144 and the second protrusion 146. As shown in FIGS. 4-9, the first protrusion 144 and the second protrusion 146 extend along an axis that is generally orthogonal (e.g., within 20 degrees of an orthogonal line) to a common plane within which the first longitudinal frame member 134 and the second longitudinal frame member 126 extend. As shown in FIGS. 5-6 and 8-9, the first protrusion 144 defines a first aperture 145, and the second protrusion 146 defines a second aperture 147. The first aperture 145 and the second aperture 147 define a pair of front lift points. An operator may engage the front lift points with a sling, cable, or other device to elevate military vehicle 1000 from a ground surface (e.g., for transport).

According to an exemplary embodiment, the hood 122 defines an outer surface (e.g., the surface exposed to a surrounding environment) and an inner surface (e.g., the surface facing the first longitudinal frame member 124 and the second longitudinal frame member 126). It should be understood that the outer surface is separated from the inner surface by a thickness of the hood 122. As shown schematically in FIGS. 4, 6-7, and 9, first protrusion 144 and second protrusion 146 extend through a first opening and a second opening defined within the hood 122. According to an exemplary embodiment, the pair of front lift points is positioned along the outer surface of the hood 122 (e.g., to provide preferred sling angles, to facilitate operator access, etc.).

According to an exemplary embodiment, the first longitudinal frame member 124 and the second longitudinal frame member 126 are coupled to the first end 114 of the structural shell 112 with a plurality of interfaces. Such interfaces may include, by way of example, a plurality of fasteners (e.g., bolts, rivets, etc.) extending through corresponding pads coupled to the front module 120 and the structural shell 112. According to an exemplary embodiment, a lifting force applied to the pair of front lift points is transmitted into the structural shell of the passenger capsule to lift the vehicle.

In some embodiments, the military vehicle 1000 includes breakaway sections designed to absorb blast energy and separate from the remaining components of military vehicle 1000. The blast energy is partially converted into kinetic energy as the breakaway sections travel from the remainder of military vehicle 1000 thereby reducing the total energy transferred to the passengers of military vehicle 1000. According to an exemplary embodiment, at least one of the front module 120 and the rear module 130 are breakaway sections. Such a military vehicle 1000 includes a plurality of interfaces coupling the front module 120 and the rear module 130 to passenger capsule 110 that are designed to strategically fail during a blast event. By way of example, at least one of the plurality of interfaces may include a bolted connection having a specified number of bolts that are sized and positioned (e.g., five 0.5 inch bolts arranged in a pentagon, etc.) to fail as an impulse force is imparted on front module 120 or rear module 130 during a blast event. In other embodiments, other components of the military vehicle 1000 (e.g., wheel, tire, engine, etc.) are breakaway sections.

Referring again to the exemplary embodiment shown in FIGS. 4-6, the military vehicle 1000 may be lifted by a pair of apertures defined within a pair of protrusions 115. The apertures define a pair of rear lift points for military vehicle 1000. As shown in FIG. 5, the pair of protrusions 115 extend from opposing lateral sides of the structural shell 112. It should be understood that a lifting force applied directly to the pair of protrusions 115 may, along with the lifting force applied to lift structure 140, elevate the military vehicle 1000 from a ground surface. The structural shell 112 carries the loading imparted by the lifting forces applied to the lift structure 140 (e.g., through the plurality of interfaces) and the pair of protrusions 115 to elevate the military vehicle 1000 from the ground surface without damaging the passenger capsule 110, the front module 120, or the rear module 130.

Armor Assembly

Figure 10A:
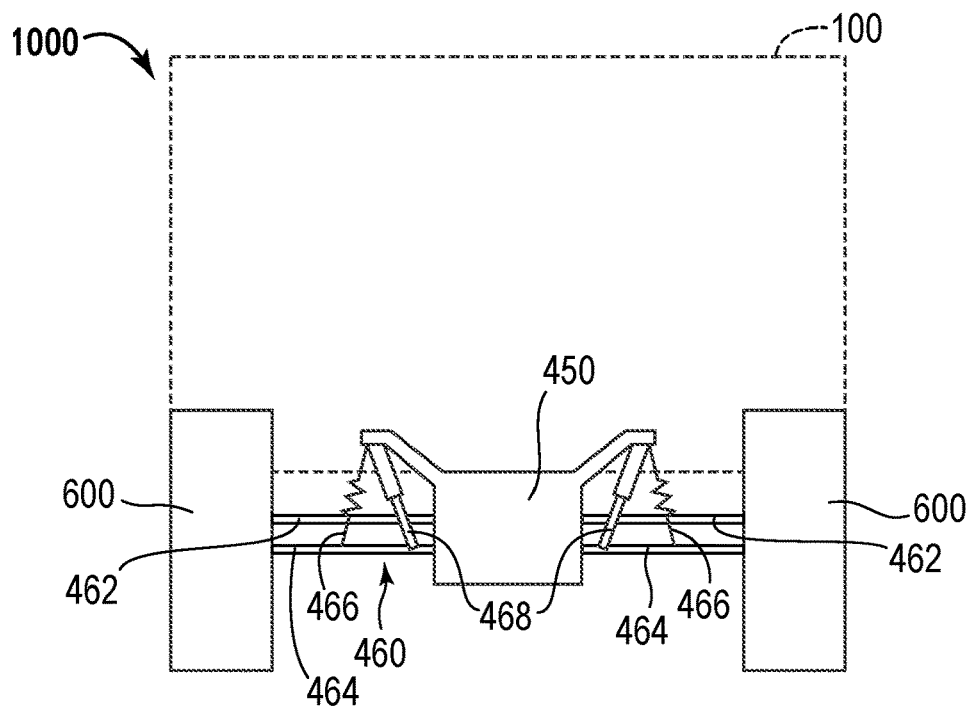
FIG. 10A is a schematic sectional view of a vehicle having at least a portion of a suspension system coupled to a transaxle, according to an exemplary embodiment.
Figure 10B:
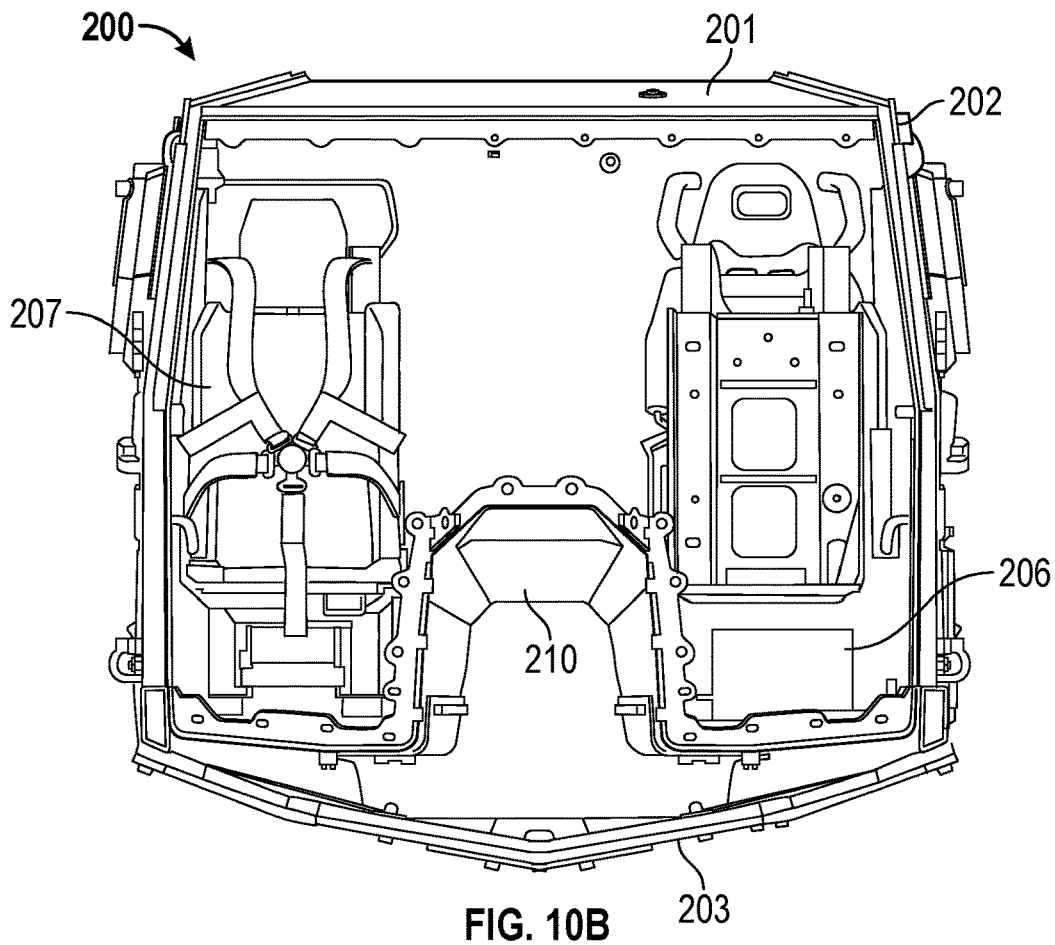
FIG. 10B is schematic sectional view of a vehicle having a passenger capsule, according to an exemplary embodiment.

Referring next to the exemplary embodiment shown in FIG. 10B, the armor assembly 200 includes fabricated subassemblies (roof, floor, sidewalls, etc.) that are bolted together. The armor assembly 200 may be manufactured from steel or another material. The armor assembly 200 provides a robust and consistent level of protection by using overlaps to provide further protection at the door interfaces, component integration seams, and panel joints.

In another embodiment, the armor assembly 200 further includes a 360-degree modular protection system that uses high hard steel, commercially available aluminum alloys, ceramic-based SMART armor, and two levels of underbody mine/improved explosive device ("IED") protection. The modular protection system provides protection against kinetic energy projectiles and fragmentation produced by IEDs and overhead artillery fire. The modular protection system includes two levels of underbody protection. The two levels of underbody protection may be made of an aluminum alloy configured to provide an optimum combination of yield strength and material elongation. Each protection level uses an optimized thickness of this aluminum alloy to defeat underbody mine and IED threats.

Referring now to FIG. 10B, the armor assembly 200 also includes a passenger capsule assembly 202. The passenger capsule assembly 202 includes a V-shaped belly deflector 203, a wheel deflector, a floating floor, footpads 206 and energy absorbing seats 207. The V-shaped belly deflector 203 is integrated into the sidewall. The V-shaped belly deflector 203 is configured to mitigate and spread blast forces along a belly. In addition, the wheel deflector mitigates and spreads blast forces. The "floating" floor utilizes isolators and standoffs to decouple forces experienced in a blast event from traveling on a direct load path to the passenger's lower limbs. The floating floor mounts to passenger capsule assembly 202 isolating the passenger's feet from direct contact with the blast forces on the belly. Moreover, footpads protect the passenger's feet. The energy absorbing seats 207 reduce shock forces to the occupants' hips and spine through a shock/spring attenuating system. The modular approach of the passenger capsule assembly 202 provides increased protection with the application of perimeter, roof and underbody add on panels. The components of the passenger capsule assembly 202 mitigate and attenuate blast effects, allow for upgrades, and facilitate maintenance and replacements.

The passenger capsule assembly 202 further includes a structural tunnel 210. For load purposes, the structural tunnel 210 replaces a frame or rail. The structural tunnel 210 has an arcuately shaped cross section and is positioned between the energy absorbing seats 207. The configuration of the structural tunnel 210 increases the distance between the ground and the passenger compartment of passenger capsule assembly 202. Therefore, the structural tunnel 210 provides greater blast protection from IEDs located on the ground because the IED has to travel a greater distance in order to penetrate the structural tunnel 210.

Engine

The engine 300 is a commercially available internal combustion engine modified for use on military vehicle 1000. The engine 300 includes a Variable Geometry Turbocharger (VGT) configured to reduce turbo lag and improve efficiency throughout the engine 300's operating range by varying compressor housing geometry to match airflow. The VGT also acts as an integrated exhaust brake system to increase engine braking capability. The VGT improves fuel efficiency at low and high speeds and reduces turbo lag for a quicker powertrain response.

The engine 300 includes a glow plug module configured to improve the engine 300 cold start performance. In some embodiments, no ether starting aid or arctic heater is required. The glow plug module creates a significant system cost and weight reduction.

In addition, engine 300 includes a custom oil sump pickup and windage tray, which ensures constant oil supply to engine components. The integration of a front engine mount into a front differential gear box eliminates extra brackets, reduces weight, and improves packaging. Engine 300 may drive an alternator/generator, a hydraulic pump, a fan, an air compressor and/or an air conditioning pump. Engine 300 includes a top-mounted alternator/generator mount in an upper section of the engine compartment that allows for easy access to maintain the alternator/generator and forward compatibility to upgrade to a higher-power export power system. A cooling package assembly is provided to counteract extreme environmental conditions and load cases.

According to an exemplary embodiment, the military vehicle 1000 also includes a front engine accessory drive (FEAD) that mounts engine accessories and transfers power from a front crankshaft dampener/pulley to the accessory components through a multiple belt drive system. According to an exemplary embodiment, the FEAD drives a fan, an alternator, an air conditioning pump, an air compressor, and a hydraulic pump. There are three individual belt groups driving these accessories to balance the operational loads on the belt as well as driving them at the required speeds. A top-mounted alternator provides increased access for service and upgradeability when switching to the export power kit (e.g., an alternator, a generator, etc.). The alternator is mounted to the front sub frame via tuned isolators, and driven through a constant velocity (CV) shaft coupled to a primary plate of the FEAD. This is driven on a primary belt loop, which is the most inboard belt to the crank dampener. No other components are driven on this loop. A secondary belt loop drives the hydraulic pump and drive through pulley. This loop has one dynamic tensioner and is the furthest outboard belt on the crankshaft dampener pulley. This belt loop drives power to a tertiary belt loop through the drive through pulley. The tertiary belt loop drives the air conditioning pump, air compressor, and fan clutch. There is a single dynamic tensioner on this loop, which is the furthest outboard loop of the system.

Transmission, Transfer Case, Differentials

Military vehicle 1000 includes a commercially available transmission 400. Transmission 400 also includes a torque converter configured to improve efficiency and decrease heat loads. Lower transmission gear ratios combined with a low range of an integrated rear differential/transfer case provide optimal speed for slower speeds, while higher transmission gear ratios deliver convoy-speed fuel economy and speed on grade. In addition, a partial throttle shift performance may be refined and optimized in order to match the power outputs of the engine 300 and to ensure the availability of full power with minimal delay from operator input. This feature makes the military vehicle 1000 respond more like a high performance pickup truck than a heavy-duty armored military vehicle.

The transmission 400 includes a driver selectable range selection. The transaxle 450 contains a differential lock that is air actuated and controlled by switches on driver's control panel. Indicator switches provide shift position feedback and add to the diagnostic capabilities of the vehicle. Internal mechanical disconnects within the transaxle 450 allow the vehicle to be either flat towed or front/rear lift and towed without removing the drive shafts. Mechanical air solenoid over-rides are easily accessible at the rear of the vehicle. Once actuated, no further vehicle preparation is needed. After the recovery operation is complete, the drive train is re-engaged by returning the air solenoid mechanical over-rides to the original positions.

The transaxle 450 is designed to reduce the weight of the military vehicle 1000. The weight of the transaxle 450 was minimized by integrating the transfercase and rear differential into a single unit, selecting an optimized gear configuration, and utilizing high strength structural aluminum housings. By integrating the transfercase and rear differential into transaxle 450 thereby forming a singular unit, the connecting drive shaft and end yokes traditionally utilized between to connect them has been eliminated. Further, since the transfercase and rear carrier have a common oil sump and lubrication system, the oil volume is minimized and a single service point is used. The gear configuration selected minimizes overall dimensions and mass providing a power dense design. The housings are cast from high strength structural aluminum alloys and are designed to support both the internal drive train loads as well as structural loads from the suspension system 460 and frame, eliminating the traditional cross member for added weight savings. According to the exemplary embodiment shown in FIG. 10A, at least a portion of the suspension system 460 (e.g., the upper control arm 462, the lower control arm 464, both the upper and lower control arms 462, 464, a portion of the spring 466, damper 468, etc.) is coupled to the transaxle 450. Such coupling facilitates assembly of military vehicle 1000 (e.g., allowing for independent assembly of the rear axle) and reduces the weight of military vehicle 1000. The front axle gearbox also utilizes weight optimized gearing, aluminum housings, and acts as a structural component supporting internal drive train, structural, and engine loads as well. The integrated transfercase allows for a modular axle design, which provides axles that may be assembled and then mounted to the military vehicle 1000 as a single unit. An integral neutral and front axle disconnect allows the military vehicle 1000 to be flat towed or front/rear lift and towed with minimal preparation. Further, the integrated design of the transaxle 450 reduces the overall weight of the military vehicle 1000. The transaxle 450 further includes a disconnect capability that allows the front tire assemblies 600 to turn without rotating the entire transaxle 450. Housings of the front and rear gearbox assembly are integrated structural components machined, for example, from high strength aluminum castings. Both front and rear gearbox housings provide stiffness and support for rear module 130 and the components of the suspension system 460.

Suspension

The military vehicle 1000 includes a suspension system 460. The suspension system 460 includes high-pressure nitrogen gas springs 466 calibrated to operate in tandem with standard low-risk hydraulic shock absorbers 468, according to an exemplary embodiment. In one embodiment, the gas springs 466 include a rugged steel housing with aluminum end mounts and a steel rod. The gas springs 466 incorporate internal sensors to monitor a ride height of the military vehicle 1000 and provide feedback for a High Pressure Gas (HPG) suspension control system. The gas springs 466 and HPG suspension control system are completely sealed and require no nitrogen replenishment for general operation.

The HPG suspension control system adjusts the suspension ride height when load is added to or removed from the military vehicle 1000. The control system includes a high pressure, hydraulically-actuated gas diaphragm pump, a series of solenoid operated nitrogen gas distribution valves, a central nitrogen reservoir, a check valve arrangement and a multiplexed, integrated control and diagnostics system.

The HPG suspension control system shuttles nitrogen between each individual gas spring and the central reservoir when the operator alters ride height. The HPG suspension control system targets both the proper suspension height, as well as the proper gas spring pressure to prevent "cross-jacking" of the suspension and ensure a nearly equal distribution of the load from side to side. The gas diaphragm pump compresses nitrogen gas. The gas diaphragm pump uses a lightweight aluminum housing and standard hydraulic spool valve, unlike more common larger iron cast industrial stationary systems not suitable for mobile applications.

The suspension system 460 includes shock absorbers 468. In addition to their typical damping function, the shock absorbers 468 have a unique cross-plumbed feature configured to provide auxiliary body roll control without the weight impact of a traditional anti-sway bar arrangement. The shock absorbers 468 may include an equal area damper, a position dependent damper, and/or a load dependent damper.

Brakes

The braking system 700 includes a brake rotor and a brake caliper. There is a rotor and caliper on each wheel end of the military vehicle 1000, according to an exemplary embodiment. According to an exemplary embodiment, the brake system includes an air over hydraulic arrangement. As the operator presses the brake pedal, and thereby operates a treadle valve, the air system portion of the brakes is activated and applies air pressure to the hydraulic intensifiers. According to an exemplary embodiment, military vehicle 1000 includes four hydraulic intensifiers, one on each brake caliper. The intensifier is actuated by the air system of military vehicle 1000 and converts air pressure from onboard military vehicle 1000 into hydraulic pressure for the caliper of each wheel. The brake calipers are fully-integrated units configured to provide both service brake functionality and parking brake functionality.

To reduce overall system cost and weight while increasing stopping capability and parking abilities, the brake calipers may incorporate a Spring Applied, Hydraulic Released (SAHR) parking function. The parking brake functionality of the caliper is created using the same frictional surface as the service brake, however the mechanism that creates the force is different. The calipers include springs that apply clamping force to the brake rotor to hold the military vehicle 1000 stationary (e.g. parking). In order to release the parking brakes, the braking system 700 applies a hydraulic force to compress the springs, which releases the clamping force. The hydraulic force to release the parking brakes comes through a secondary hydraulic circuit from the service brake hydraulic supply, and a switch on the dash actuates that force, similar to airbrake systems.

Figure 11:
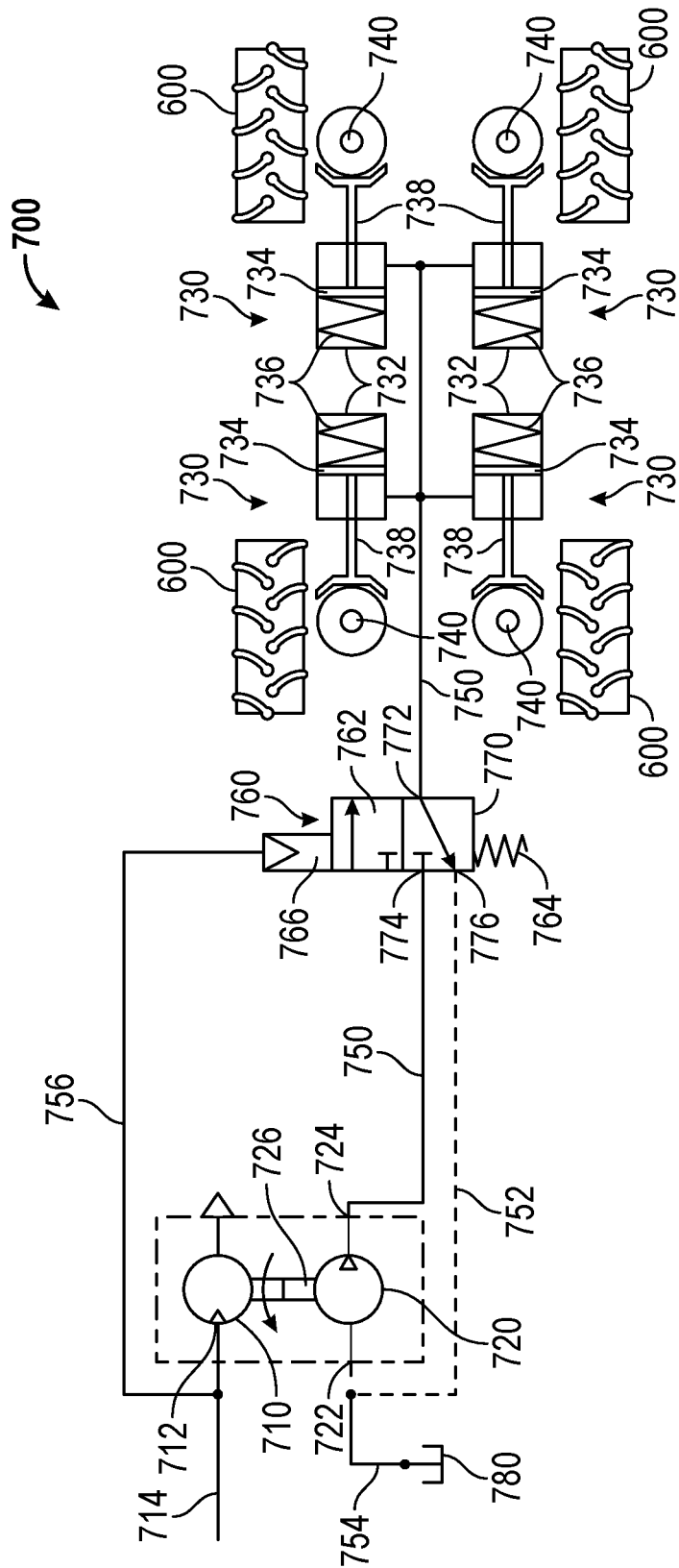
FIG. 11 is schematic view of a braking system for a vehicle, according to an exemplary embodiment.

Referring specifically to the exemplary embodiment shown in FIG. 11, braking system 700 is shown schematically to include a motor 710 having a motor inlet 712. The motor 710 is an air motor configured to be driven by an air system of military vehicle 1000, according to an exemplary embodiment. The motor 710 may be coupled to the air system of military vehicle 1000 with a line 714. As shown in FIG. 11, braking system 700 includes a pump 720 that includes a pump inlet 722, a pump outlet 724, and a pump input shaft 726. The pump input shaft 726 is rotatably coupled to the motor 710 (e.g., an output shaft of the motor 710).

As shown in FIG. 11, braking system 700 includes a plurality of actuators 730 coupled to the pump outlet 724. According to an exemplary embodiment, the actuators 730 includes a housing 732 that defines an inner volume and a piston 734 slidably coupled to the housing 732 and separating the inner volume into a first chamber and a second chamber. The plurality of actuators 730 each include a resilient member (e.g., spring, air chamber, etc.), shown as resilient member 736 coupled to the housing and configured to generate a biasing force (e.g., due to compression of the resilient member 736, etc.). According to an exemplary embodiment, the plurality of actuators 730 each also include a rod 738 extending through an end of the housing 732. The rod 738 is coupled at a first end to piston 734 and coupled at a second end to a brake that engages a braking member (e.g., disk, drum, etc.), shown as braking member 740. As shown in FIG. 11, the rod is configured to apply the biasing force to the braking member 740 that is coupled to wheel and tire assemblies 600 thereby inhibiting movement of the military vehicle 1000.

According to an exemplary embodiment, a control is actuated by the operator, which opens a valve to provide air along the line 714. Pressurized air (e.g., from the air system of military vehicle 1000, etc.) drives motor 710, which engages pump 720 to flow a working fluid (e.g., hydraulic fluid) a through line 750 that couples the pump outlet 724 to the plurality of actuators 730. According to an exemplary embodiment, the pump 720 is a hydraulic pump and the actuator 730 is a hydraulic cylinder. Engagement of the pump 720 provides fluid flow through line 750 and into at least one of the first chamber and the second chamber of the plurality of actuators 730 to overcome the biasing force of resilient member 736 with a release force. The release force is related to the pressure of the fluid provided by pump 720 and the area of the piston 734. Overcoming the biasing force releases the brake thereby allowing movement of military vehicle 1000.

As shown in FIG. 11, braking system 700 includes a valve, shown as directional control valve 760, positioned along the line 750. According to an exemplary embodiment, directional control valve 760 includes a valve body 770. The valve body 770 defines a first port 772, a second port 774, and a reservoir port 776, according to an exemplary embodiment. When valve gate 762 is in the first position (e.g., pressurized air is not applied to air pilot 766) valve gate 762 places first port 772 in fluid communication with reservoir port 776. A reservoir 780 is coupled to the reservoir port 776 with a line 752. The reservoir 780 is also coupled to the pump inlet 722 with a line 754. It should be understood that the fluid may be forced into reservoir 780 from any number of a plurality of actuators 730 by resilient member 736 (e.g., when pump 720 is no longer engaged).

According to an exemplary embodiment, the directional control valve 760 selectively couples the plurality of actuators 730 to the pump outlet 724 or reservoir 780. The directional control valve 760 includes a valve gate 762 that is moveable between a first position and a second position. According to an exemplary embodiment, the valve gate 762 is at least one of a spool and a poppet. The valve gate 762 is biased into a first position by a valve resilient member 764. According to an exemplary embodiment, the directional control valve 760 also includes an air pilot 766 positioned at a pilot end of the valve gate 762. The air pilot 766 is coupled to line 714 with a pilot line 756. Pressurized air is applied to line 714 drives motor 710 and is transmitted to air pilot 766 to overcome the biasing force of valve resilient member 764 and slide valve gate 762 into a second position. In the second position, valve gate 762 places first port 772 in fluid communication with 774 thereby allowing pressurized fluid from pump 720 to flow into actuators 730 to overcome the biasing force of resilient member 736 and allow uninhibited movement of military vehicle 1000.

Control System

Figure 12:
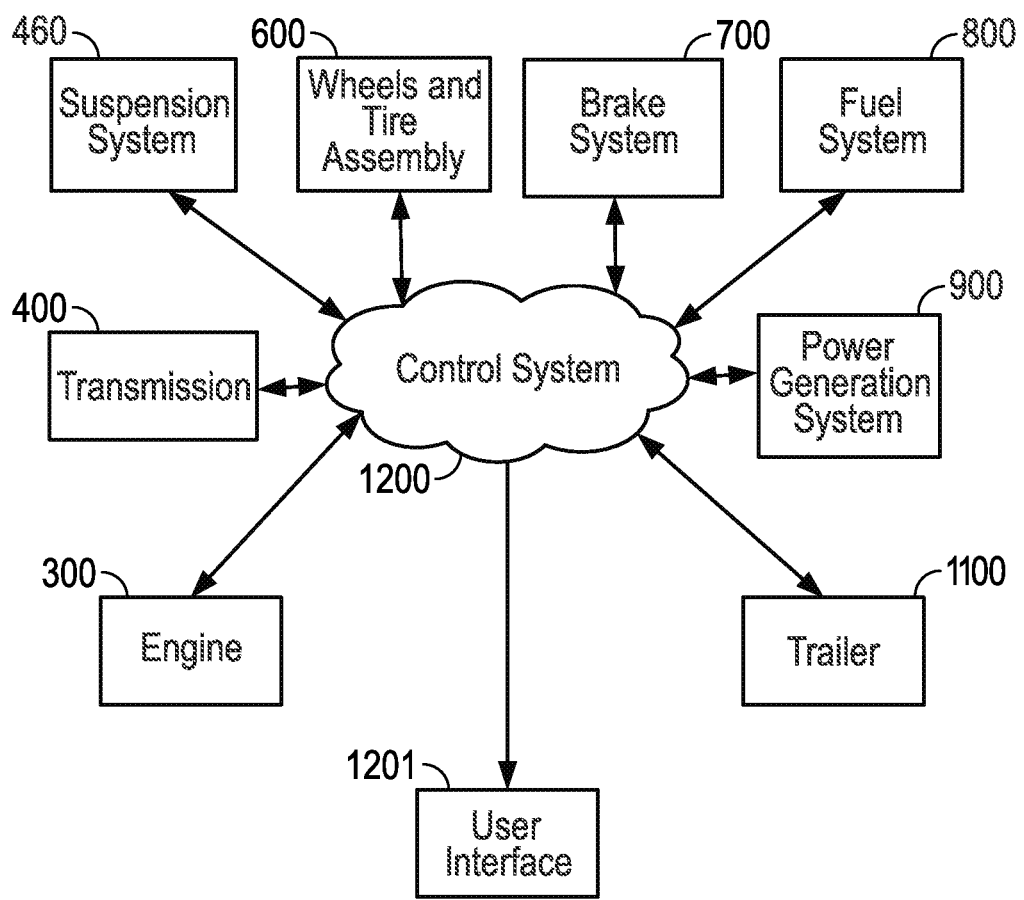
FIG. 12 is schematic view of a vehicle control system, according to an exemplary embodiment.

Referring to FIG. 12, the systems of the military vehicle 1000 are controlled and monitored by a control system 1200. The control system 1200 integrates and consolidates information from various vehicle subsystems and displays this information through a user interface 1201 so the operator/crew can monitor component effectiveness and control the overall system. For example, the subsystems of the military vehicle 1000 that can be controlled or monitored by the control system 1200 are the engine 300, the transmission 400, the transaxle 450, the suspension system 460, the wheels and tire assemblies 600, the braking system 700, the fuel system 800, the power generation system 900, and a trailer 1100. However, the control system 1200 is not limited to controlling or monitoring the subsystems mentioned above. A distributed control architecture of the military vehicle 1000 enables the control system 1200 process.

In one embodiment, the control system 1200 provides control for terrain and load settings. For example, the control system 1200 can automatically set driveline locks based on the terrain setting, and can adjust tire pressures to optimal pressures based on speed and load. The control system 1200 can also provide the status for the subsystems of the military vehicle 1000 through the user interface 1201. In another example, the control system 1200 can also control the suspension system 460 to allow the operator to select appropriate ride height.

The control system 1200 may also provide in-depth monitoring and status. For example, the control system 1200 may indicate on-board power, output power details, energy status, generator status, battery health, and circuit protection. This allows the crew to conduct automated checks on the subsystems without manually taking levels or leaving the safety of the military vehicle 1000.

The control system 1200 may also diagnose problems with the subsystems and provide a first level of troubleshooting. Thus, troubleshooting can be initiated without the crew having to connect external tools or leave the safety of the military vehicle 1000.

The construction and arrangements of the vehicle, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

The invention claimed is:
1. A military vehicle comprising:
 a passenger capsule; and
 a brake system including:
  a brake housing defining an inner volume;
  a piston separating the inner volume into a first chamber and a second chamber;
  a rod extending through an end of the brake housing and coupled to the piston, the rod positioned to selectively engage with a brake to inhibit movement of a tractive element;

a resilient member positioned within the inner volume and configured to generate a brake biasing force against the piston such that the rod is biased into engagement with the brake;

an air-to-hydraulic intensifier coupled to the brake housing, the air-to-hydraulic intensifier configured to receive a supply of air and provide a hydraulic fluid to the brake housing based on the supply of air to overcome the brake biasing force to disengage the rod from the brake to permit movement of the tractive element;

a hydraulic reservoir; and a valve positioned between the air-to-hydraulic intensifier, the brake housing, and the hydraulic reservoir.

2. The military vehicle of claim 1, wherein the valve includes a first port fluidly coupled to the air-to-hydraulic intensifier, a second port fluidly coupled to the hydraulic reservoir, a third port fluidly coupled to the brake housing, and a valve gate that is repositionable between a first position and a second position, the first position coupling the first port to the third port to fluidly couple the air-to-hydraulic intensifier to the brake housing, the second position coupling the second port to the third port to fluidly couple the hydraulic reservoir to the brake housing.

3. The military vehicle of claim 2, wherein the brake biasing force of the resilient member is configured to bias the piston to force the hydraulic fluid out of the brake housing, through the valve, and into the hydraulic reservoir in response to the valve being in the second position.

4. The military vehicle of claim 2, wherein the valve includes:

an air pilot positioned at a first end of the valve gate; and a biasing element positioned at an opposing second end of the valve gate, the biasing element configured to provide a valve biasing force to the valve gate to bias the valve gate into the second position.

5. The military vehicle of claim 4, further comprising an air supply line coupled to the air-to-hydraulic intensifier and the air pilot, the air supply line configured to provide the supply of air to the air-to-hydraulic intensifier and the air pilot.

6. The military vehicle of claim 5, wherein the supply of air provided to the air pilot overcomes the valve biasing force to reposition the valve gate into the first position to place the air-to-hydraulic intensifier into fluid communication with the brake housing to facilitate disengaging the brake.

7. The military vehicle of claim 1, wherein the air-to-hydraulic intensifier includes a hydraulic pump.

8. The military vehicle of claim 1, wherein the passenger capsule defines a front door aperture, a rear door aperture, and an interlocking door frame portion positioned along and protruding outward from an exterior of the passenger capsule and positioned between the front door aperture and the rear door aperture.

9. The military vehicle of claim 8, wherein the passenger capsule includes (i) a front door positioned to selectively enclose the front door aperture and (ii) a rear door positioned to selectively enclose the rear door aperture, and wherein the front door and the rear door selectively engage with the interlocking door frame portion when closed.

10. The military vehicle of claim 1, wherein the passenger capsule includes sidewalls and a floor coupled to the sidewalls, wherein bottom edges of the sidewalls extend past and below the floor, further comprising a belly deflector having lateral ends coupled to the bottom edges of the sidewalls, wherein the belly deflector is positioned beneath and isolated from the floor.

11. The military vehicle of claim 1, wherein the passenger capsule includes a floor that defines a structural tunnel having an arcuate-shaped profile extending into an interior of the passenger capsule, further comprising energy absorbing seats positioned on opposing sides of the structural tunnel, the energy absorbing seats including a shock attenuating system.

12. The military vehicle of claim 1, further comprising:

a generator configured to generate electricity; and an export power kit coupled to the generator and configured to facilitate exporting power off of the military vehicle.

13. A military vehicle comprising:

a brake system including:

an air-to-hydraulic intensifier configured to couple to a brake actuator that engages a brake to limit movement of a tractive element, the air-to-hydraulic intensifier configured to receive a supply of air and provide a hydraulic fluid to the brake actuator based on the supply of air to overcome a brake biasing force of the brake actuator to disengage the brake actuator from the brake to permit movement of the tractive element;

a hydraulic reservoir coupled to the air-to-hydraulic intensifier; and a valve positioned between the air-to-hydraulic intensifier, the brake actuator, and the hydraulic reservoir; and a passenger capsule defining a front door aperture, a rear door aperture, and an interlocking door frame portion positioned along and protruding outward from an exterior of the passenger capsule between the front door aperture and the rear door aperture, the passenger capsule including (i) a front door positioned to selectively enclose the front door aperture and (ii) a rear door positioned to selectively enclose the rear door aperture, wherein the front door and the rear door selectively engage with the interlocking door frame portion when closed.

14. The military vehicle of claim 13, wherein the valve includes:

a first port fluidly coupled to the air-to-hydraulic intensifier;

a second port fluidly coupled to the hydraulic reservoir;

a third port fluidly coupled to the brake actuator; and a valve gate that is repositionable between a first position and a second position, the first position coupling the first port to the third port to fluidly couple the air-to-hydraulic intensifier to the brake actuator, the second position coupling the second port to the third port to fluidly couple the hydraulic reservoir to the brake actuator.

15. The brake system of claim 14, wherein the valve includes:

an air pilot positioned at a first end of the valve gate; and a biasing element positioned at an opposing second end of the valve gate, the biasing element configured to provide a valve biasing force to the valve gate to bias the valve gate into the second position.

16. A brake system comprising:

an air-to-hydraulic intensifier configured to couple to a brake actuator that engages a brake to limit movement of a tractive element, the air-to-hydraulic intensifier configured to receive a supply of air and provide a hydraulic fluid to the brake actuator based on the supply of air to overcome a brake biasing force of the brake actuator to disengage the brake actuator from the brake to permit movement of the tractive element;
a hydraulic reservoir coupled to the air-to-hydraulic intensifier; and
a valve positioned between the air-to-hydraulic intensifier, the brake actuator, and the hydraulic reservoir, the valve including:
a first port fluidly coupled to the air-to-hydraulic intensifier;
a second port fluidly coupled to the hydraulic reservoir;
a third port fluidly coupled to the brake actuator; and
a valve gate that is repositionable between a first position and a second position, the first position coupling the first port to the third port to fluidly couple the air-to-hydraulic intensifier to the brake actuator, the second position coupling the second port to the third port to fluidly couple the hydraulic reservoir to the brake actuator.

17. The brake system of claim 16, wherein the valve includes:
an air pilot positioned at a first end of the valve gate; and
a biasing element positioned at an opposing second end of the valve gate, the biasing element configured to provide a valve biasing force to the valve gate to bias the valve gate into the second position.

18. The brake system of claim 17, further comprising an air supply line coupled to the air-to-hydraulic intensifier and the air pilot, the air supply line configured to provide the supply of air to the air-to-hydraulic intensifier and the air pilot.

19. The brake system of claim 18, wherein the supply of air provided to the air pilot overcomes the valve biasing force to reposition the valve gate into the first position to place the air-to-hydraulic intensifier into fluid communication with the brake actuator to facilitate disengaging the brake.

* * * * *